(12) United States Patent
Oyobe et al.

(10) Patent No.: US 8,186,465 B2
(45) Date of Patent: May 29, 2012

(54) HYBRID VEHICLE AND CONTROLLING METHOD THEREOF

(75) Inventors: Hichirosai Oyobe, Toyota (JP); Makoto Nakamura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 725 days.

(21) Appl. No.: 11/990,981

(22) PCT Filed: Aug. 30, 2006

(86) PCT No.: PCT/JP2006/317600
§ 371 (c)(1),
(2), (4) Date: Feb. 26, 2008

(87) PCT Pub. No.: WO2007/026941
PCT Pub. Date: Mar. 8, 2007

(65) Prior Publication Data
US 2009/0101421 A1    Apr. 23, 2009

(30) Foreign Application Priority Data
Sep. 1, 2005   (JP) .................. 2005-253475

(51) Int. Cl.
*B60W 20/00* (2006.01)
*B60W 10/24* (2006.01)
(52) U.S. Cl. ................. 180/65.275; 180/65.29
(58) Field of Classification Search ........... 180/65.21, 180/65.22, 65.27, 65.24, 65.275, 65.29
See application file for complete search history.

(56) References Cited

U.S. PATENT DOCUMENTS

| 5,568,390 | A | 10/1996 | Hirota et al. |
| 5,650,710 | A | 7/1997 | Hotta |
| 5,892,346 | A | 4/1999 | Moroto et al. |
| 6,793,027 | B1 | 9/2004 | Yamada et al. |
| 6,856,866 | B2 | 2/2005 | Nakao |
| 7,013,205 | B1* | 3/2006 | Hafner et al. .................. 701/22 |
| 7,607,499 | B2* | 10/2009 | Egami ..................... 180/65.265 |
| 7,665,559 | B2* | 2/2010 | De La Torre-Bueno ... 180/65.29 |
| 2002/0107618 | A1* | 8/2002 | Deguchi et al. ................. 701/22 |
| 2003/0015358 | A1 | 1/2003 | Abe et al. |
| 2004/0030471 | A1 | 2/2004 | Faye |
| 2005/0082097 | A1* | 4/2005 | Ichimoto et al. ............. 180/65.2 |
| 2005/0127855 | A1 | 6/2005 | Wobben |

FOREIGN PATENT DOCUMENTS

| GB | 2 273 614 A | 6/1994 |
| JP | A 7-46701 | 2/1995 |
| JP | A 7-55484 | 3/1995 |

(Continued)

OTHER PUBLICATIONS

May 12, 2011 Supplemental European Search Report in European Application No. 06797497.2.

*Primary Examiner* — John R Olszewski
(74) *Attorney, Agent, or Firm* — Oliff & Berridge, PLC

(57) ABSTRACT

When an ignition key is turned ON, a control apparatus predicts the arrival time to a chargeable location (such as home). When the control apparatus determines that the expected arrival time is in the nighttime, it sets SOC control upper and lower limit values for an EV traveling-importance mode that are lower than SOC control upper and lower limit values for an HV traveling-importance mode, and controls an SOC of a battery based on the upper and lower limit values.

18 Claims, 13 Drawing Sheets

FOREIGN PATENT DOCUMENTS

| | | |
|---|---|---|
| JP | A 8-126121 | 5/1996 |
| JP | A 8-154307 | 6/1996 |
| JP | A 11-98699 | 4/1999 |
| JP | A 2001-69612 | 3/2001 |
| JP | A 2001-258177 | 9/2001 |
| JP | A 2002-171603 | 6/2002 |
| JP | A 2002-250633 | 9/2002 |
| JP | A 2003-32803 | 1/2003 |
| JP | A 2003-32807 | 1/2003 |
| JP | A 2004-178965 | 6/2004 |
| JP | A 2005-91112 | 4/2005 |

* cited by examiner

| CONTROL IN CHARGING | BOOST CONVERTER | | FIRST INVERTER | | SECOND INVERTER | |
|---|---|---|---|---|---|---|
| | Q1 | Q2 | Q11 | Q12 | Q21 | Q22 |
| VAC>0:(V1>V2) | ON | OFF | OFF OR SWITCHING | SWITCHING | OFF | ON |
| VAC<0:(V1<V2) | ON | OFF | OFF | ON | OFF OR SWITCHING | SWITCHING |

HYBRID VEHICLE AND CONTROLLING METHOD THEREOF

TECHNICAL FIELD

The present invention relates to a hybrid vehicle, and in particular, to a hybrid vehicle in which a battery can be charged from a source external to the vehicle.

BACKGROUND ART

In recent years, hybrid vehicles are receiving widespread attention as environmentally friendly vehicles. As motive power source thereof, the hybrid vehicles use, in addition to a conventional engine, an electric power storage apparatus (battery), an inverter, and an electric motor (motor) driven by the inverter.

Among such hybrid vehicles, a hybrid vehicle having an externally charging function for charging the battery using an external power supply is known. The hybrid vehicle having the externally charging function can provide an advantage of reducing the frequency of visiting a filling station for charging fuel, for example if the battery can be charged from a household commercial power supply.

Japanese Patent Laying-Open No. 8-154307 discloses a hybrid vehicle provided with such an externally charging function. The hybrid vehicle includes: a battery that is capable of being charged from an external charger; an electric motor powered by the battery to drive wheels; control means for controlling the operation of the electric motor; an internal combustion engine that is directly or indirectly used for driving the wheels; and traveling time related amount calculation means for calculating an amount related to a traveling time from charging of the battery by the external charger. The control means limits the output of the electric motor when the traveling time related amount calculated by the traveling time related amount calculation means reaches a prescribed amount.

In the hybrid vehicle, when the vehicle travels for a long time without being charged from an external source, the output of the electric motor is limited, and necessarily, when traveling is continued using fuel by the internal combustion engine, the output of the electric motor is limited. Therefore, the driver is prompted to perform external charging. Accordingly, with the hybrid vehicle, dependence on the internal combustion engine can be reduced.

The hybrid vehicle disclosed in Japanese Patent Laying-Open No. 8-154307 reduces the dependence on the internal combustion engine. In other words, the externally charged power is used by priority. However, Japanese Patent Laying-Open No. 8-154307 does not particularly consider about the electricity costs of charging from an external source. It is a critical problem for the hybrid vehicle provided with the externally charging function to reduce the electricity costs.

The electricity price is generally inexpensive in a late-night electricity time slot where power consumption is small. If charging is performed in a time slot where the electricity price is inexpensive, the electricity costs can be reduced. Conversely, when charging must be performed in a time slot where the electricity price is expensive, it is preferable to minimize the charging amount in light of cost reduction.

DISCLOSURE OF THE INVENTION

Accordingly, the present invention has been made to solve such a problem. An object of the present invention is to provide a hybrid vehicle in which a battery can be charged from a source external to the vehicle, and with which reduction in the electricity costs can be achieved.

The present invention is directed to a hybrid vehicle incorporating an internal combustion engine and a rotating electric machine as its motive power sources. The hybrid vehicle includes: an electric power storage apparatus that is capable of being charged and discharged and that supplies electric power to the rotating electric machine; an electric power input portion receiving electric power provided from a source external to the vehicle for charging the electric power storage apparatus; an electric power generation apparatus generating electric power using an output from the internal combustion engine and supplying the generated electric power to the electric power storage apparatus; a control portion for controlling a state of charge (SOC) of the electric power storage apparatus to attain a prescribed control range or control target value; and an input apparatus for switching the prescribed control range or control target value.

In the hybrid vehicle according to the present invention, electric power provided from a source external to the vehicle is received by the electric power input portion and the electric power storage apparatus can be charged. When the SOC of the electric power storage apparatus becomes low during traveling, the electric power storage apparatus can be charged by driving of the internal combustion engine and the electric power generation apparatus. The SOC of the electric power storage apparatus is controlled by the control portion to attain a prescribed control range or control target value. Specifically, when the SOC of the electric power storage apparatus becomes low, the control portion drives the internal combustion engine and the electric power generation apparatus to thereby charge the electric power storage apparatus. Here, in the hybrid vehicle, the prescribed control range or control target value can be switched by the input apparatus, and therefore, when it is expected to arrive at a location where charging is possible (for example, home where charging equipment is installed) during a time slot where the electricity price is inexpensive (for example, the late-night electricity time slot), the prescribed control range or control target value can be set to be lower than usual using the input apparatus. Then, the electric power charged in the electric power storage apparatus is used by priority during the traveling until arriving at the chargeable location, and the amount of charging from an external power supply at the chargeable location can be increased. Thus, a greater amount of inexpensive electricity can be allotted to charging.

Accordingly, with the hybrid vehicle of the present invention, the electricity costs in charging the electric power storage apparatus from a source external to the vehicle can be reduced.

Preferably, the input apparatus is capable of switching between a first mode (HV traveling-importance mode) of driving by priority the internal combustion engine and the electric power generation apparatus and a second mode (EV traveling-importance mode) of stopping the internal combustion engine and the electric power generation apparatus and using by priority electric power stored in the electric power storage apparatus. The control portion sets, when the second mode is selected by the input apparatus, the prescribed control range or control target value to be lower than when the first mode is selected by the input apparatus.

In the hybrid vehicle, when it is expected to arrive at a chargeable location during a time slot where the electricity price is inexpensive, by selecting the second mode by the input apparatus, the prescribed control range or control target value can be set to be lower than when the first traveling mode is selected. Then, the power charged in the electric power storage apparatus is used by priority during the traveling until arriving at the chargeable location, and the amount of charging from an external power supply at the chargeable location can be increased. Thus, a greater amount of inexpensive electricity can be allotted to charging. Accordingly, with the hybrid vehicle, the electricity costs in charging the electric power storage apparatus from a source external to the vehicle can be reduced.

The present invention is also directed to a hybrid vehicle incorporating an internal combustion engine and a rotating electric machine as its motive power sources. The hybrid vehicle includes: an electric power storage apparatus that is capable of being charged and discharged and that supplies electric power to the rotating electric machine; an electric power input portion receiving electric power provided from a source external to the vehicle for charging the electric power storage apparatus; an electric power generation apparatus generating electric power using an output from the internal combustion engine and supplying the generated electric power to the electric power storage apparatus; a control portion controlling a state of charge of the electric power storage apparatus to attain a prescribed control range or control target value; and a prediction portion predicting an arrival time to a location where the electric power storage apparatus can be charged from the electric power input portion. The control portion sets, when the arrival time predicted by the prediction portion is included in a prescribed time slot, the prescribed control range or control target value to be lower than when the arrival time is not included in the prescribed time slot.

Preferably, the prescribed time slot includes a late-night electricity time slot where an electricity price is inexpensive.

In the hybrid vehicle according to the present invention, electric power provided from a source external to the vehicle is received by the electric power input portion and the electric power storage apparatus can be charged. When the SOC of the electric power storage apparatus becomes low during traveling, the electric power storage apparatus can be charged by driving of the internal combustion engine and the electric power generation apparatus. The SOC of the electric power storage apparatus is controlled by the control portion to attain a prescribed control range or control target value. Specifically, when the SOC of the electric power storage apparatus becomes low, the control portion drives the internal combustion engine and the electric power generation apparatus to thereby charge the electric power storage apparatus. Here, in the hybrid vehicle, a prediction portion predicting the arrival time to a location where charging is possible (for example, home where charging equipment is installed) is provided. When the expected arrival time is included in the prescribed time slot, the control portion sets the prescribed control range or control target value to be lower than when the expected arrival time is not included in the prescribed time slot. Then, the power charged in the electric power storage apparatus is used by priority during the traveling until arriving at the chargeable location, and the amount of charging from an external power supply at the chargeable location can be increased. Thus, for example by setting the prescribed time slot to be the nighttime, a greater amount of inexpensive late-night electricity can be allotted to charging.

Accordingly, with the hybrid vehicle, the electricity costs in charging the electric power storage apparatus from a source external to the vehicle can be reduced. Additionally, since the prescribed control range or control target value is automatically switched based on the expected arrival time predicted by the prediction portion, a switching operation by the driver is not necessary.

Preferably, the hybrid vehicle further includes an input apparatus for setting a traveling schedule of the vehicle. The control portion stops setting the prescribed control range or control target value to be low, when a time difference between the arrival time predicted by the prediction portion and a scheduled time for starting next traveling determined based on the traveling schedule set from the input apparatus is shorter than a prescribed time period.

When departure time is immediately after the arrival at the chargeable location, the electric power storage apparatus cannot be charged enough. Accordingly, the present hybrid vehicle is provided with an input apparatus for setting a traveling schedule of the vehicle. The control portion stops setting the prescribed control range or control target value to be low when a time difference between the expected arrival time predicted by the prediction portion and a scheduled time for starting next traveling determined based on the traveling schedule set from the input apparatus is shorter than a prescribed time period, even if the expected arrival time is included in the prescribed time slot. Therefore, the SOC of the electric power storage apparatus for the next traveling is ensured. Accordingly, with the hybrid vehicle, a situation where the SOC of the electric power storage apparatus is unnecessarily reduced can be avoided.

Preferably, the hybrid vehicle further includes a learning portion for learning a traveling schedule of the vehicle based on a traveling pattern of the vehicle. The control portion stops setting the prescribed control range or control target value to be low, when a time difference between the arrival time predicted by the prediction portion and a scheduled time for starting next traveling determined based on the traveling schedule learned by the learning portion is shorter than a prescribed time period.

The hybrid vehicle is provided with the learning portion for learning a traveling schedule of the vehicle based on day-to-day traveling patterns of the vehicle. The control portion stops setting the prescribed control range or control target value to be low when a time difference between the expected arrival time predicted by the prediction portion and a scheduled time for starting next traveling determined based on the traveling schedule learned by the learning portion is shorter than a prescribed time period, even if the expected arrival time is included in the prescribed time slot. Therefore, the SOC of the electric power storage apparatus for the next traveling is ensured. Accordingly, with the hybrid vehicle, a situation where the SOC of the electric power storage apparatus is unnecessarily reduced can be avoided. Additionally, since the traveling schedule learned by the learning portion is used, setting of the traveling schedule by the driver is not necessary.

Preferably, the electric power generation apparatus includes an additional rotating electric machine having its rotation shaft mechanically linked to a crankshaft of the internal combustion engine. The hybrid vehicle further includes: a first inverter provided corresponding to the rotating electric machine; a second inverter provided corresponding to the additional rotating electric machine; and an inverter control portion controlling the first and second inverters. The rotating electric machine and the additional rotating electric machine respectively include first and second three-phase coils as stator coils. The electric power input portion includes a first terminal connected to a neutral point of the first three-phase coil, and a second terminal connected to a neutral point of the second three-phase coil. The inverter control portion controls the first and second inverters so that alternating-current power provided across the first and second terminals is converted into direct-current power and provided to the electric power storage apparatus.

In the hybrid vehicle, using the rotating electric machine as a motive power source, the additional rotating electric machine included in the electric power generation apparatus, the first and second inverters respectively provided corresponding to them, and the inverter control portion, charging to the electric power storage apparatus from an external source is realized. Accordingly, since the hybrid vehicle does not require a separate external charging apparatus, reduction in size and weight of the vehicle can be realized, and hence improved fuel efficiency can be realized.

Accordingly, with the present invention, the electricity costs in charging the electric power storage apparatus from a source external to the vehicle can be reduced. Additionally, a situation where the SOC of the electric power storage apparatus is unnecessarily reduced can be avoided.

BEST MODES FOR CARRYING OUT THE INVENTION

Figure 1:
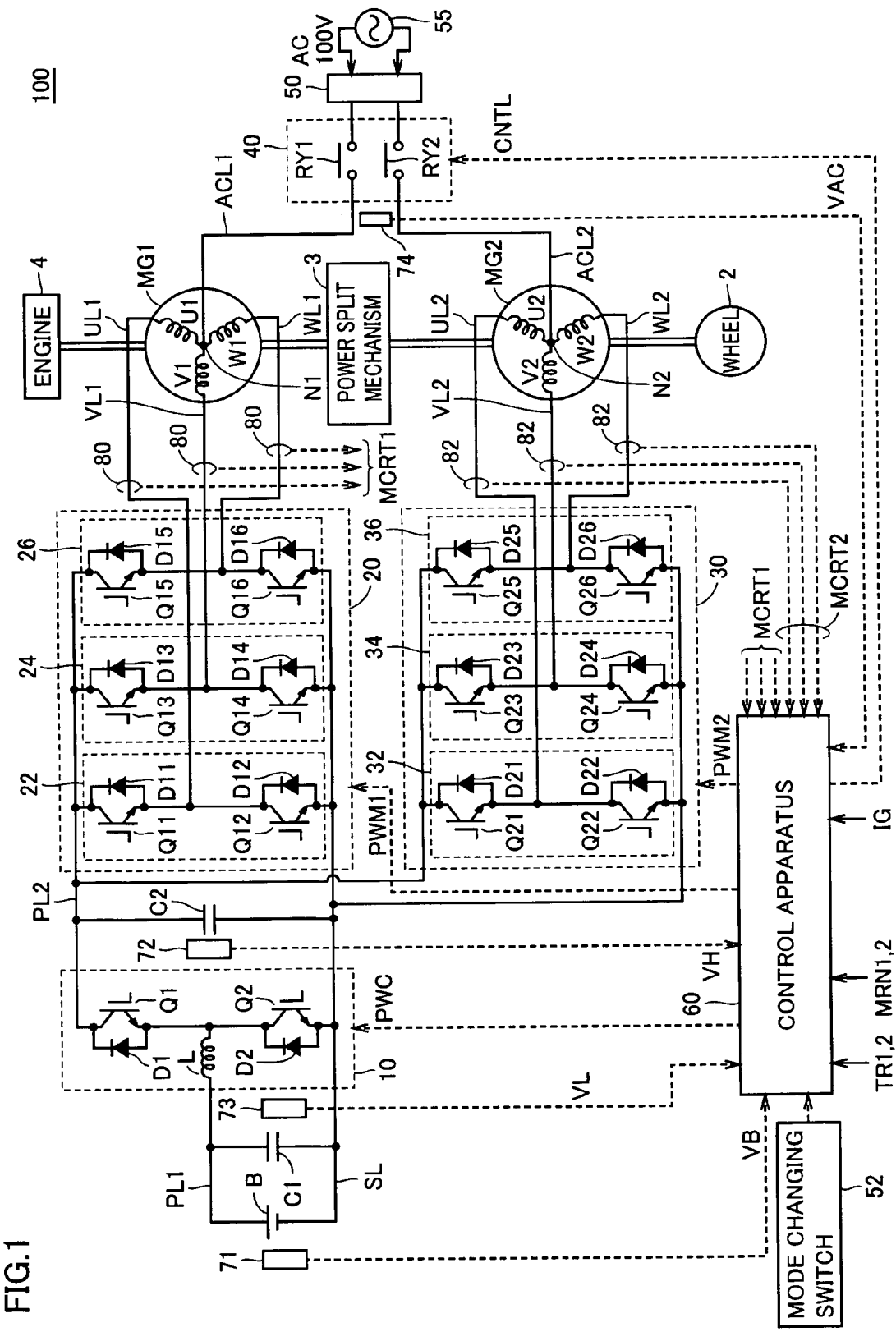
FIG. 1 is an overall block diagram of a hybrid vehicle according to a first embodiment of the present invention.

In the following, embodiments of the present invention are described in detail referring to the drawings. In the drawings, the same or corresponding portions are denoted by the same character, and description thereof will not be repeated.

First Embodiment

FIG. 1 is an overall block diagram of a hybrid vehicle according to a first embodiment of the present invention. Referring to FIG. 1, a hybrid vehicle 100 includes battery B, a boost converter 10, inverters 20, 30, power supply lines PL1, PL2, an earth line SL, U-phase lines UL1, UL2, V-phase lines VL1, VL2, W-phase lines WL1, WL2, motor-generators MG1, MG2, an engine 4, a power split mechanism 3, and wheels 2.

Power split mechanism 3 is a mechanism linked to engine 4 and motor-generators MG1, MG2 for distributing motive power among them. For example, as power split mechanism 3, a planetary gear mechanism having three rotation shafts of a sun gear, a planetary carrier, and a ring gear can be used. These three rotation shafts are connected to the rotation shafts of engine 4, and motor-generators MG1, MG2, respectively. For example, by inserting the crankshaft of engine 4 through the center of a hollow rotor of motor-generator MG1, engine 4 and motor-generators MG1, MG2 can mechanically be connected to power split mechanism 3.

Motor-generator MG2 has its rotation shaft linked to wheels 2 by not-shown reduction gear, differential gear and the like. A speed reducer to the rotation shaft of motor-generator MG2 can further be incorporated inside power split mechanism 3.

Motor-generator MG1 is incorporated in hybrid vehicle 100 as an element that operates as a generator driven by engine 4 and that operates as an electric motor that can start engine 4. Motor-generator MG2 is incorporated in hybrid vehicle 100 as an electric motor that drives wheels 2 that are the driving wheels.

Motor-generators MG1, MG2 are three-phase alternating current (AC) motors, e.g., three-phase AC synchronous motors. Motor-generator MG1 includes, as a stator coil, a three-phase coil formed with U-phase coil U1, V-phase coil V1 and W-phase coil W1. Motor-generator MG2 includes, as a stator coil, a three-phase coil formed with U-phase coil U2, V-phase coil V2 and W-phase coil W2.

Motor-generator MG1 uses the output of engine 4 to generate a three-phase AC voltage, and outputs the generated three-phase AC voltage to inverter 20. Motor-generator MG1 generates drive force by the three-phase AC voltage received from inverter 20, and starts engine 4.

Motor-generator MG2 generates drive torque of the vehicle by three-phase AC voltage received from inverter 30. In regenerative braking mode of the vehicle, motor-generator MG2 generates three-phase AC voltage and outputs the same to inverter 30.

Battery B is a direct current (DC) power supply that can be charged and discharged, and configured with a secondary battery such as a nickel-hydride battery, a lithium-ion battery or the like, for example. Battery B supplies DC power to boost converter 10. Battery B is charged by a DC voltage output from boost converter 10. A capacitor of large capacitance can be used as battery B.

Boost converter 10 includes a reactor-L, npn transistors Q1, Q2 and diodes D1, D2. Reactor L has one end connected to power supply line PL1 and the other end connected to a connection point between npn transistors Q1, Q2. Npn transistors Q1, Q2 are connected in series between power supply line PL2 and earth line SL and receives at their base a signal PWC from control apparatus 60. Diodes D1, D2 for passing current from the emitter side to the collector side are respectively connected between collectors and emitters of npn transistors Q1, Q2.

As the aforementioned npn transistors and as npn transistors described in the following, for example IGBTs (Insulated Gate Bipolar Transistors) can be used. Also, in place of npn transistors, electric power switching elements such as power MOSFETs (Metal Oxide Semiconductor Field-Effect Transistors) can be used.

Inverter 20 includes a U-phase arm 22, a V-phase arm 24 and a W-phase arm 26. U-phase arm 22, V-phase arm 24 and W-phase arm 26 are provided in parallel between power supply line PL2 and earth line SL.

U-phase arm 22 includes npn transistors Q11, Q12 connected in series. V-phase arm 24 includes npn transistors Q13, Q14 connected in series. W-phase arm 26 includes npn transistors Q15, Q16 connected in series. Diodes D11-D16 for passing current from the emitter side to the collector side are respectively connected between collectors and emitters of npn transistors Q11-Q16. Connection points of npn transistors in respective phase arms are respectively connected to respective ends, not being neutral point N1, of the U, W, and W-phase coils of motor-generator MG1, via U, V, and W-phase lines UL1, VL1, WL1.

Inverter 30 includes a U-phase arm 32, a V-phase arm 34 and a W-phase arm 36. U-phase arm 32, V-phase arm 34 and W-phase arm 36 are provided in parallel between power supply line PL2 and earth line SL.

U-phase arm 32 includes npn transistors Q21, Q22 connected in series. V-phase arm 34 includes npn transistors Q23, Q24 connected in series. W-phase arm 36 includes npn transistors Q25, Q26 connected in series. Diodes D21-D26 for passing current from the emitter side to the collector side are respectively connected between collectors and emitters of npn transistors Q21-Q26. In inverter 30 also, connection points in respective phase arms are respectively connected to respective ends, not being neutral point N2, of the U, W, and W-phase coils of motor-generator MG2, via U, V, W-phase lines UL2, VL2, WL2.

Hybrid vehicle 100 further includes capacitors C1, C2, a relay circuit 40, a connector 50, a mode changing switch 52, a control apparatus 60, AC lines ACL1, ACL2, voltage sensors 71-74, and current sensors 80, 82.

Capacitor C1 is connected between power supply line PL1 and earth line SL, and reduces the effect of voltage fluctuation to battery B and boost converter 10. A voltage VL between power supply line PL1 and earth line SL is measured by voltage sensor 73.

Capacitor C2 is connected between power supply line PL2 and earth line SL, and reduces the effect of voltage fluctuation to inverters 20, 30 and boost converter 10. A voltage VH between power supply line PL2 and earth line SL is measured by voltage sensor 72.

Boost converter 10 boosts a DC voltage supplied from battery B via power supply line PL1 and supplies the result to power supply line PL2. More specifically, based on signal PWC from control apparatus 60, boost converter 10 stores the current that flows in accordance with the switching operation of npn transistor Q2 as magnetic field energy in reactor L. Then, boost converter 10 discharges the stored energy by passing current to power supply line PL2 via diode D1, synchronizing with the timing where npn transistor Q2 is turned OFF. In this manner, boost converter 10 performs the voltage boost operation.

In addition, based on signal PWC from control apparatus 60, boost converter 10 reduces a DC voltage received from one of or both of inverters 20 and 30 via power supply line PL2 to the voltage level of battery B, and charges battery B.

Based on signal PWM1 from control apparatus 60, inverter 20 converts a DC voltage supplied from power supply line PL2 into a three-phase AC voltage and drives motor-generator MG1. Thus, motor-generator MG1 is driven to generate torque specified by a torque command value TR1. Based on signal PWM1 from control apparatus 60, inverter 20 converts the three-phase AC voltage, having been generated by motor-generator MG1 receiving the output of engine 4, into a DC voltage, and outputs the converted DC voltage to power supply line PL2.

Based on signal PWM2 from control apparatus 60, inverter 30 converts a DC voltage supplied from power supply line PL2 into a three-phase AC voltage and drives motor-generator MG2. Thus, motor-generator MG2 is driven to generate torque specified by a torque command value TR2. Based on signal PWM2 from control apparatus 60, inverter 30 converts the three-phase AC voltage, having been generated by motor-generator MG2 receiving the rotation force of the drive shaft in the regenerative braking mode of the vehicle, into a DC voltage, and outputs the converted DC voltage to power supply line PL2.

It is to be noted that, the regenerative braking used herein includes breaking involving regeneration when a foot brake operation is performed by the driver of hybrid vehicle 100, or deceleration (or stopping of acceleration) of the vehicle with regeneration by turning-off of an accelerator pedal during driving rather than by the operation of the foot brake.

Relay circuit 40 includes relays RY1, RY2. As relays RY1, RY2, mechanical contact relays can be used, for example. Semiconductor relays can also be used. Relay RY1 is provided between AC line ACL1 and connector 50, and turned ON/OFF based on signal CNTL from control apparatus 60. Relay RY2 is provided between AC line ACL2 and connector 50, and turned ON/OFF based on signal CNTL from control apparatus 60.

Relay circuit 40 performs connection/disconnection between AC lines ACL1, ACL2 and connector 50, in response to a signal CNTL from control apparatus 60. That is, when relay circuit 40 receives signal CNTL of H (logic high) level from control apparatus 60, relay circuit 40 electrically connects AC lines ACL1, ACL2 to connector 50. When it receives signal CNTL of L (logic low) level from control apparatus 60, relay circuit 40 electrically disconnects AC lines ACL1, ACL2 from connector 50.

Connector 50 includes not-shown first and second terminals for receiving AC power from a commercial power supply 55 located externally to the vehicle. The first and second terminals are respectively connected to relays RY1, RY2 of relay circuit 40. The voltage VAC between AC lines ACL1 and ACL2 is measured by voltage sensor 74, and the measured value is transmitted to control apparatus 60.

Mode changing switch 52 is a switch for the driver to select one of an HV traveling-importance mode or an EV traveling-importance mode. As used herein, the HV traveling-importance mode is a mode in which importance is placed on an HV traveling mode predicated on regeneration by engine 4 and motor-generator MG1, rather than on an EV traveling mode in which engine 4 and motor-generator MG1 are stopped and traveling is conducted employing only battery B as the energy source. On the other hand, the EV traveling-importance mode is a mode in which importance is placed on the EV traveling mode rather than on the HV traveling mode. They will be detailed later.

When the HV traveling-importance mode is selected, mode changing switch 52 outputs a signal of H-level to control apparatus 60. When the EV traveling-importance mode is selected, mode changing switch 52 outputs a signal of L-level to control apparatus 60.

Voltage sensor 71 detects a voltage VB of battery B, and outputs detected voltage VB to control apparatus 60. Voltage sensor 73 detects a voltage between both ends of capacitor C1, that is, an input voltage VL to boost converter 10, and outputs detected voltage VL to control apparatus 60. Voltage sensor 72 detects a voltage between both ends of capacitor C2, that is, an output voltage VH (corresponding to the input voltage of inverters 20, 30, hereinafter the same applies) from boost converter 10, and outputs detected voltage VH to control apparatus 60.

Current sensor 80 detects motor current MCRT1 passing through motor-generator MG1, and outputs detected motor current MCRT1 to control apparatus 60. Current sensor 82 detects motor current MCRT2 passing through motor-generator MG2, and outputs detected motor current MCRT2 to control apparatus 60.

Based on torque command values TR1, TR2 and motor rotation speeds MRN1, MRN2 of motor-generators MG1, MG2 output from a not-shown HV-ECU (Electronic Control Unit), voltage VL from voltage sensor 73, and voltage VH from voltage sensor 72, control apparatus 60 generates signal PWC for driving boost converter 10, and outputs generated signal PWC to boost converter 10.

Additionally, based on voltage VH and motor current MCRT1 and torque command value TR1 of motor-generator MG1, control apparatus 60 generates signal PWM1 for driving motor-generator MG1, and outputs generated signal PWM1 to inverter 20. Furthermore, based on voltage VH and motor current MCRT2 and torque command value TR2 of motor-generator MG2, control apparatus 60 generates signal PWM2 for driving motor-generator MG2, and outputs generated signal PWM2 to inverter 30.

Here, based on signal IG from a not-shown ignition key (or ignition switch, hereinafter the same applies) and the SOC of battery B, control apparatus 60 generates signals PWM1, PWM2 for controlling inverters 20, 30 so that AC power from commercial power supply 55 provided across neutral points N1, N2 of motor-generators MG1, MG2 is converted into DC power and battery B is charged with the same.

Furthermore, control apparatus 60 determines, based on the SOC of battery B, whether or not charging from a source external to the vehicle is possible. When control apparatus 60 determines that charging is possible, it outputs signal CNTL of H level to relay circuit 40. On the other hand, when control apparatus 60 determines that battery B is almost fully charged and charging is not possible, it outputs signal CNTL of L level to relay circuit 40. When signal IG indicates a stop state, control apparatus 60 stops inverters 20 and 30.

Furthermore, control apparatus 60 controls the SOC of battery B within a prescribed control range. Specifically, control apparatus 60 controls driving of engine 4 and motor-generator MG1 that generates power using the output of engine 4 (including stopping engine 4 and motor-generator MG1), thereby controlling the SOC of battery B.

Furthermore, control apparatus 60 receives a signal from mode changing switch 52. When control apparatus 60 determines, based on the received signal, that the EV traveling-importance mode is selected, by a method that will be described later, it sets the control range of the SOC of battery B to be lower than when the HV traveling-importance mode is selected by mode changing switch 52.

It is to be noted that, selection of one of the HV traveling-importance mode and the EV traveling-importance mode by mode changing switch 52 corresponds to switching of the prescribed control range of the SOC of battery B.

Next, control of boost converter 10 and inverters 20, 30, as well as control of charging from commercial power supply 55 exerted by control apparatus 60 are described. In the following, referring to FIGS. 2-7, only the portions related to such control will be extracted and explained, and control as to the SOC of battery B exerted by control apparatus 60 will be described referring to FIG. 8 et seq.

Figure 2:
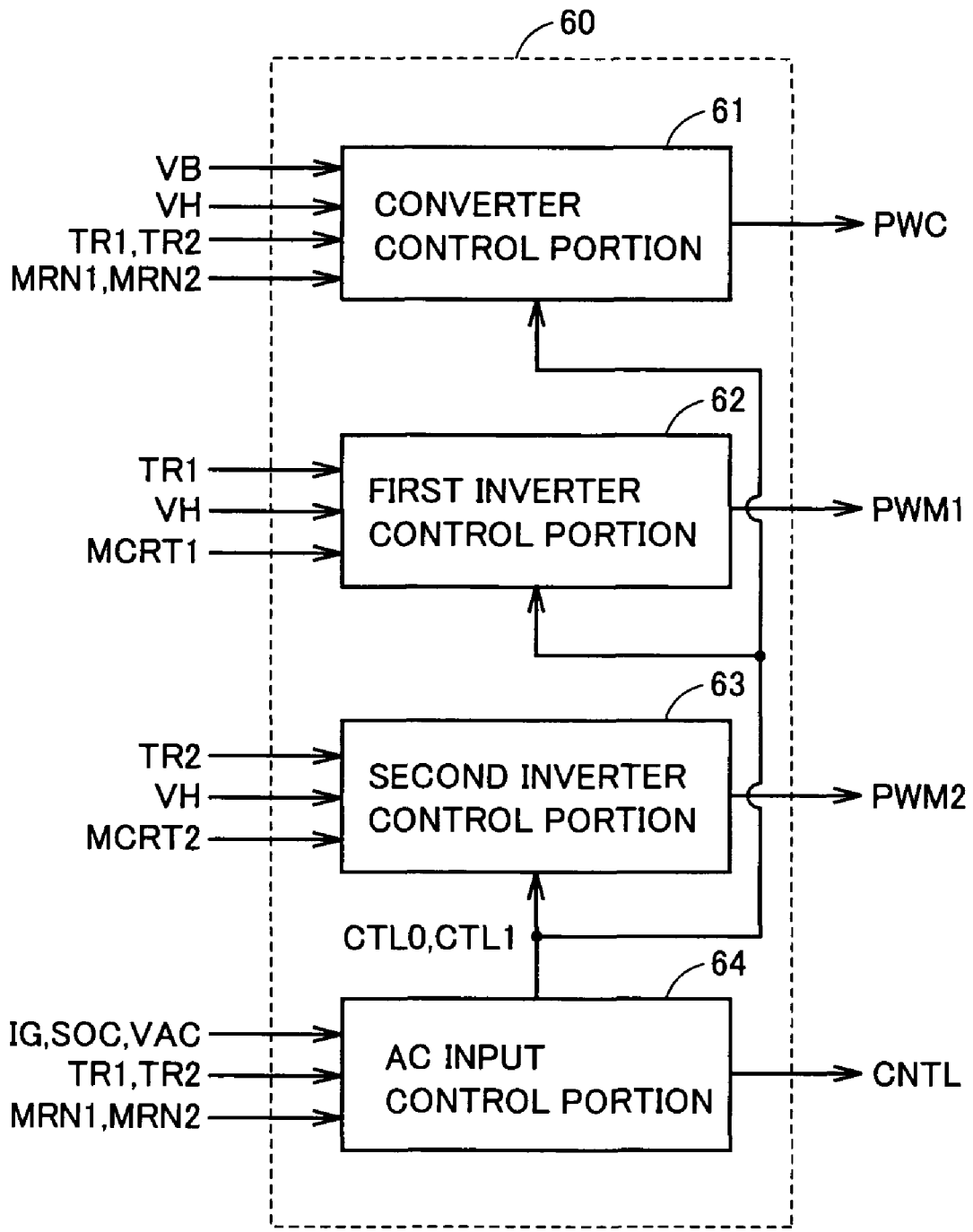
FIG. 2 is a functional block diagram of a control apparatus shown in FIG. 1.

FIG. 2 is a functional block diagram of control apparatus 60 shown in FIG. 1. Referring to FIG. 2, control apparatus 60 includes a converter control portion 61, a first inverter control portion 62, a second inverter control portion 63, and an AC input control portion 64. Converter control portion 61 generates, based on voltage VB, voltage VH, torque command values TR1, TR2, and motor rotation speeds MRN1, MRN2, signal PWC for turning ON/OFF npn transistors Q1, Q2 of boost converter 10, and outputs generated signal PWC to boost converter 10.

First inverter control portion 62 generates, based on torque command value TR1 and motor current MCRT1 of motor-generator MG1 and voltage VH, signal PWM1 for turning ON/OFF npn transistors Q11-Q16 of inverter 20, and outputs generated signal PWM1 to inverter 20.

Second inverter control portion 63 generates, based on torque command value TR2 and motor current MCRT2 of motor-generator MG2 and voltage VH, signal PWM2 for turning ON/OFF npn transistors Q21-Q26 of inverter 30, and outputs generated signal PWM2 to inverter 30.

AC input control portion 64 determines the drive state of motor-generators MG1, MG2 based on torque command values TR1, TR2 and motor rotation speeds MRN1, MRN2. In accordance with signal IG and the SOC of battery B, AC input control portion 64 converts an AC voltage supplied to connector 50 into a DC voltage and boosts the same by controlling cooperatively two inverters 20, 30, and charges battery B.

When AC input control portion 64 determines that the drive state of motor-generators MG1, MG2 is the stop state and that the ignition key is turned to the OFF position based on signal IG, AC input control portion 64 performs a charging operation if the SOC of battery B is lower than a prescribed level. Specifically, AC input control portion 64 outputs signal CNTL of H level to relay circuit 40, thereby bringing relays RY1, RY2 into conduction. If there is any input of voltage VAC, AC input control portion 64 generates control signal CTL1 in accordance therewith. AC input control portion 64 converts the AC voltage supplied to connector 50 into a DC voltage and boost the same by controlling cooperatively inverters 20, 30, and permits charging of battery B.

On the other hand, when AC input control portion 64 determines that the motor-generators MG1, MG2 are in the driving state or that the ignition key is turned to the ON position based on signal IG, and when the SOC of battery B is higher than a prescribed level, AC input control portion 64 does not perform a charging operation. Specifically, AC input control portion 64 outputs signal CNTL of L level to relay circuit 40, thereby opening relays RY1, RY2. AC input control portion 64 generates control signal CTL0 and causes boost converter 10 and inverters 20, 30 to perform the normal operation of the vehicle driving mode.

Figure 3:
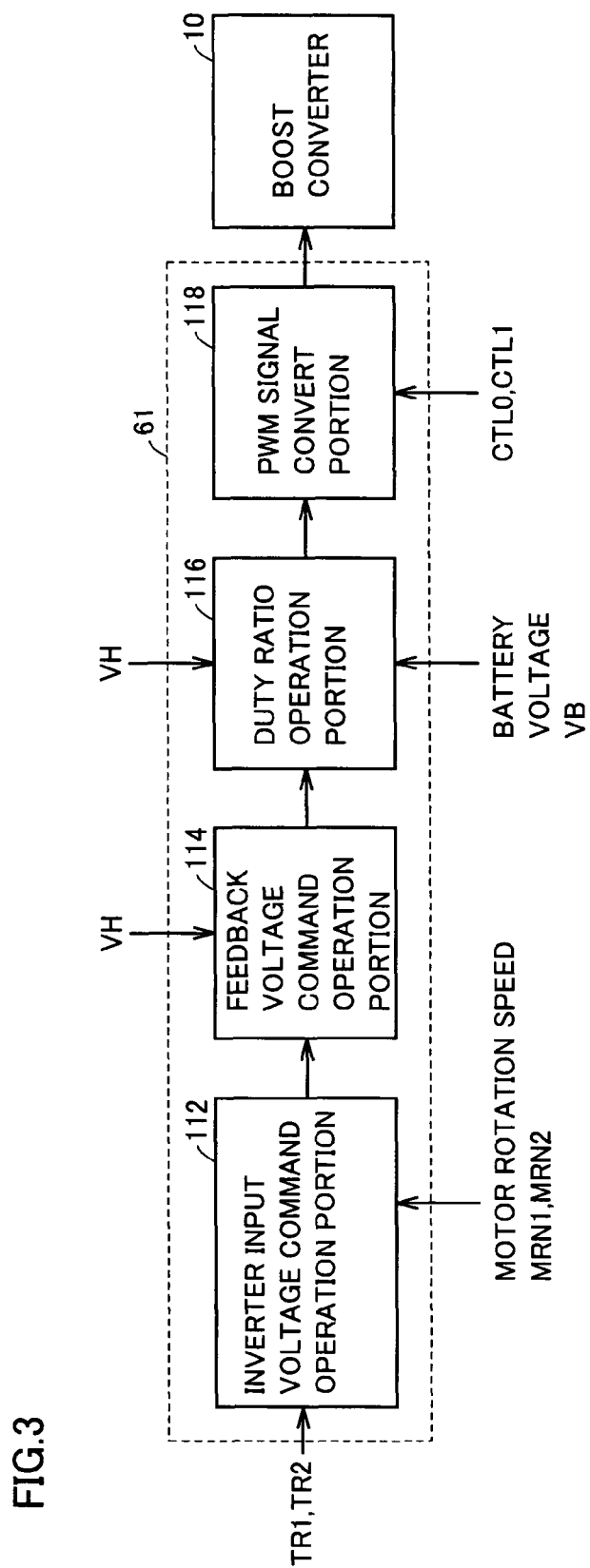
FIG. 3 is a functional block diagram of a converter control portion shown in FIG. 2.

FIG. 3 is a functional block diagram of converter control portion 61 shown in FIG. 2. Referring to FIG. 3, converter control portion 61 includes an inverter input voltage command operation portion 112, a feedback voltage command operation portion 114, a duty ratio operation portion 116, and a PWM signal convert portion 118.

Based on torque command values TR1, TR2 and motor rotation speeds MRN1, MRN2, inverter input voltage command operation portion 112 performs an operation to obtain an optimum value (target value) of the inverter input voltage, that is, voltage command VH_com, and outputs obtained voltage command VH_com to feedback voltage command operation portion 114.

Based on output voltage VH of boost converter 10 detected by voltage sensor 72 and voltage command VH_com from inverter input voltage command operation portion 112, feedback voltage command operation portion 114 performs an operation to obtain feedback voltage command VH_com_fb for controlling output voltage VH to voltage command VH_com, and outputs obtained feedback voltage command VH_com_fb to duty ratio operation portion 116.

Based on voltage VB from voltage sensor 71 and feedback voltage command VH_com_fb from feedback voltage command operation portion 114, duty ratio operation portion 116 performs an operation to obtain a duty ratio for controlling output voltage VH of boost converter 10 to voltage command VH_com, and outputs the obtained duty ratio to PWM signal convert portion 118.

Based on the duty ratio received from duty ratio operation portion 116, PWM signal convert portion 118 generates a PWM (Pulse Width Modulation) signal for turning ON/OFF npn transistors Q1, Q2 of boost converter 10, and outputs the generated PWM signal as signal PWC to npn transistors Q1, Q2 of boost converter 10.

By increasing the ON duty of npn transistor Q2 of the lower arm of boost converter 10, the electric power storage in reactor L can be increased, and therefore an output of higher voltage can be obtained. On the other hand, by increasing the ON duty of npn transistor Q1 of the upper arm, the voltage of power supply line PL2 is reduced. Accordingly, by controlling the duty ratio of npn transistors Q1, Q2, the voltage of power supply line PL2 can be controlled to any voltage equal to or greater than the output voltage of battery B.

Furthermore, when control signal CTL1 is activated, PWM signal convert portion 118 brings npn transistor Q1 into conduction and npn transistor Q2 out of conduction irrespective of the output of duty ratio operation portion 116. Thus, charging current can be passed from power supply line PL2 to power supply line PL1.

Figure 4:
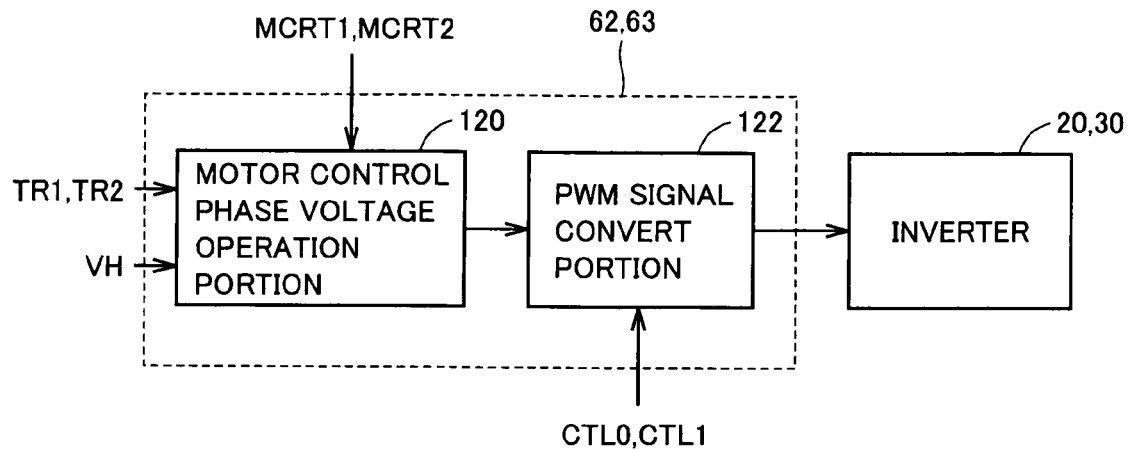
FIG. 4 is a functional block diagram of first and second inverter control portions shown in FIG. 2.

FIG. 4 is a functional block diagram of first and second inverter control portions 62, 63 shown in FIG. 2. Referring to FIG. 4, first and second inverter control portions 62, 63 each include motor control phase voltage operation portion 120 and PWM signal convert portion 122.

Motor control phase voltage operation portion 120 receives input voltage VH of inverters 20, 30 from voltage sensor 72. Motor control phase voltage operation portion 120 receives motor current MCRT1 (or MCRT2) passing through each phase of motor-generator MG1 (or MG2) from current sensor 80 (or 82). Motor control phase voltage operation portion 120 receives torque command value TR1 (or TR2) from the HV-ECU. Then, based on these input values, motor control phase voltage operation portion 120 performs an operation to obtain a voltage to be applied to each phase coil of motor-generator MG1 (or MG2), and outputs the obtained each phase coil voltage to PWM signal convert portion 122.

When PWM signal convert portion 122 receives control signal CTL0 from AC input control portion 64, based on each phase coil voltage command received from motor control phase voltage operation portion 120, PWM signal convert portion 122 generates signal PWM1_0 (one type of signal PWM1) (or PWM2_0 (one type of signal PWM2)) for actually turning ON/OFF npn transistors Q11-Q16 (or Q21-Q26) of inverter 20 (or 30), and outputs generated signal PWM1_0 (or PWM2_0) to npn transistors Q11-Q16 (or Q21-Q26) of inverter 20 (or 30).

Thus, npn transistors Q11-Q16 (or Q21-Q26) are switching-controlled, and the current passing through each phase of motor-generator MG1 (or MG2) is controlled so that motor-generator MG1 (or MG2) outputs the instructed torque. As a result, motor torque according to torque command value TR1 (or TR2) is output.

Additionally, when PWM signal convert portion 122 receives control signal CTL1 from AC input control portion 64, irrespective of the output of motor control phase voltage operation portion 120, PWM signal convert portion 122 generates signal PWM1_1 (one type of signal PWM1) (or PWM2_1(one type of signal PWM2)) for turning ON/OFF npn transistors Q11-Q16 (or Q21-Q26) so that AC current of the same phase is passed through each of U-phase arm 22 (or 32), V-phase arm 24 (or 34), and W-phase arm 26 (or 36) of inverter 20 (or 30), and outputs generated signal PWM 1_1 (or PWM 2_1) to npn transistors Q11-Q16 (or Q21-Q26) of inverter 20 (or 30).

When AC current of the same phase passes through each of U, V, W-phase coils, rotation torque is not generated in motor-generators MG1, MG2. By the cooperative control of inverters 20 and 30, AC voltage VAC is converted into a DC charging voltage.

Next, a method of generating a DC charging voltage in hybrid vehicle 100 from commercial power supply 55 (having a voltage level of AC voltage VAC) located external to the vehicle is described.

Figure 5:
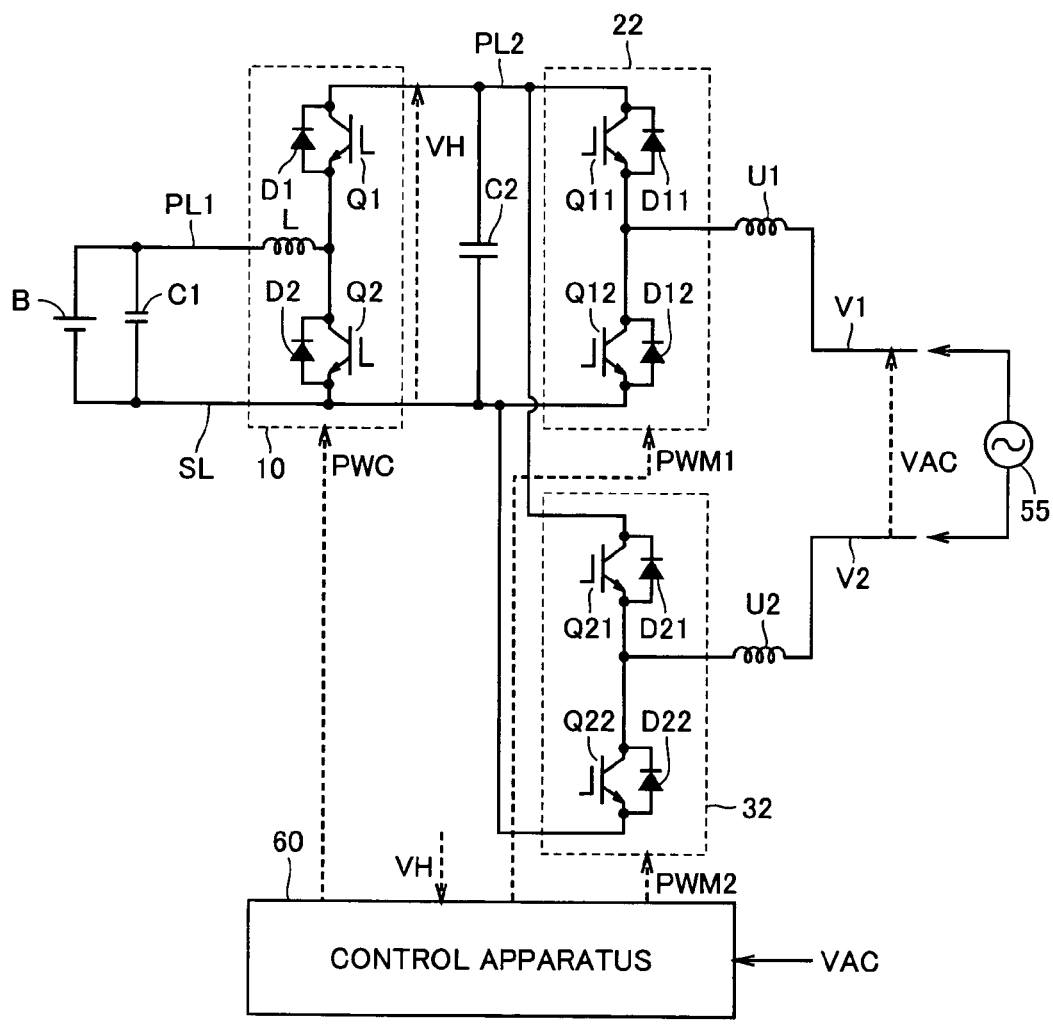
FIG. 5 schematically shows a portion of the block diagram of FIG. 1 that is related to charging.

FIG. 5 shows the simplified circuit diagram of FIG. 1 focusing on the portion related to charging. In FIG. 5, the U-phase arms in inverters 20 and 30 of FIG. 1 are representatively shown. Similarly, the U-phase coils of the three-phase coils of the motor-generators are representatively shown. The U-phase is representatively described, since the circuits of the other two phases passing current of the same phase perform similarly as in the U-phase. As can be seen from FIG. 5, the set of U-phase coil U1 and U-phase arm 22, and the set of U-phase coil U2 and U-phase arm 32 are each configured similarly to boost converter 10. Accordingly, they are capable of not only converting an AC voltage of, for example, 100V into a DC voltage, but also further boosting the voltage to be converted into a charging voltage of, for example, about 200V.

Figures 6, 7:
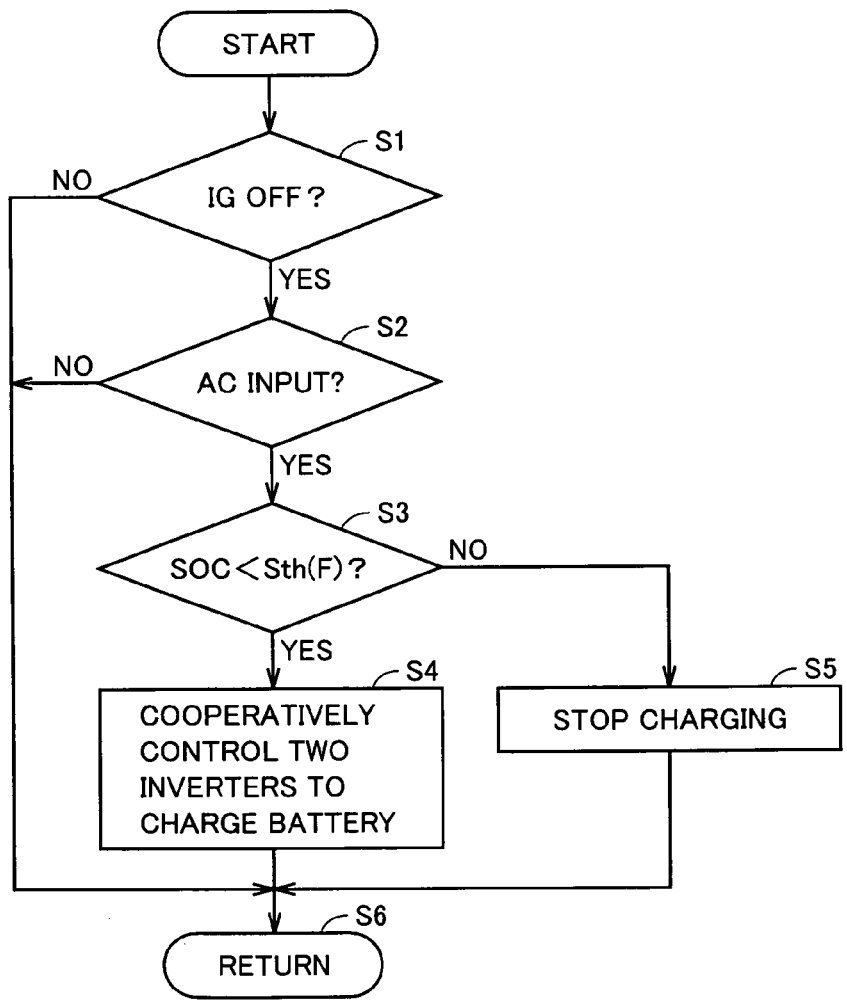
FIG. 6 shows a control state of transistors in charging.
FIG. 7 is a flowchart showing a control structure of a program related to determination of starting charging by the control apparatus shown in FIG. 1.

FIG. 6 shows a control state of transistors in the charging mode. Referring to FIGS. 5 and 6, when voltage VAC>0, that is, when voltage V1 of line ACL1 is higher than voltage V2 of line ACL2, npn transistor Q1 of boost converter 10 is brought into the ON state while npn transistor Q2 is brought into the OFF state. Thus, boost converter 10 becomes capable of passing charging current from power supply line PL2 to power supply line PL1.

In the first inverter (inverter 20), npn transistor Q12 is switched in the cycle and duty ratio in accordance with voltage VAC, and npn transistor Q11 is controlled to be in the OFF state or to be in a switched state where it is brought into conduction synchronizing with the conduction of diode D11. Here, in the second inverter (inverter 30), npn transistor Q21 is brought into the OFF state, while npn transistor Q22 is controlled to be in the ON state.

When voltage VAC>0, in the ON state of npn transistor Q12, current passes through the route of coil U1→npn transistor Q12→diode D22→coil U2. Here, the energy stored in coils U1, U2 is discharged when npn transistor Q12 is brought into the OFF state, and current passes through power supply line PL2 via diode D11. In order to reduce the loss by diode D11, npn transistor Q11 may be brought into conduction synchronizing with the conduction period of diode D11. Based on the values of voltage VAC and voltage VH, a boost ratio is obtained, and switching cycle and duty ratio of npn transistor Q12 are determined.

Next, when voltage VAC<0, that is, when voltage V1 of line ACL1 is lower than voltage V2 of line ACL2, npn transistor Q1 of the boost converter is brought into the ON state and npn transistor Q2 is brought into the OFF state. Thus, boost converter 10 becomes capable of passing charging current from power supply line PL2 to power supply line PL1.

In the second inverter, npn transistor Q22 is switched in the cycle and duty ratio in accordance with voltage VAC, and npn transistor Q21 is controlled to be in the OFF state or to be in a switched state where it is brought into conduction synchronizing with the conduction of diode D21. Here, in the first inverter, npn transistor Q11 is brought into the OFF state, while npn transistor Q12 is controlled to be in the ON state.

When voltage VAC<0, in the ON state of npn transistor Q22, current passes through the route of coil U2→npn transistor Q22→diode D12→coil U1. Here, the energy stored in coils U1, U2 is discharged when npn transistor Q22 is brought into the OFF state, and current passes through power supply line PL2 via diode D21. In order to reduce the loss by diode D21, npn transistor Q21 may be brought into conduction synchronizing with the conduction period of diode D21. In this case also, based on the values of voltage VAC and voltage VH, a boost ratio is obtained, and switching cycle and duty ratio of npn transistor Q22 are determined.

FIG. 7 is a flowchart showing the control structure of the program related to determination of starting charging by control apparatus 60 shown in FIG. 1. The process shown in this flowchart is called from the main routine and executed, at regular time intervals or every time a prescribed condition is satisfied.

Referring to FIG. 7, control apparatus 60 determines, based on signal IG from the ignition key, whether or not the ignition key has been turned to the OFF position (step S1). When control apparatus 60 determines that the ignition key has not been turned to the OFF position (NO in step S1), it is inappropriate to perform charging by connecting the charging cable to the vehicle, and therefore the process proceeds to step S6 where the control moves to the main routine.

When it is determined that the ignition key has been turned to the OFF position in step S1 (YES in step S1), it is determined to be appropriate to perform charging, and therefore the process proceeds to step S2. In step S2, relays RY1 and RY2 are controlled from the nonconductive state to the conductive state, and voltage VAC is measured by voltage sensor 74. When an AC voltage is not observed, it is considered that the charging cable is not connected to the socket of connector 50. Therefore, the charging operation is not performed and the process proceeds to step S6 where the control moves to the main routine.

On the other hand, when an AC voltage is observed as voltage VAC in step S2, the process proceeds to step S3. In step S3, it is determined whether or not the SOC of battery B is smaller than threshold value Sth(F) representing the fully charged state.

When SOC of battery B<Sth(F) is satisfied, it is the state where charging is possible. Accordingly, the process proceeds to step S4. In step S4, control apparatus 60 cooperatively controls two inverters and charges battery B.

In step S3, when SOC of battery B<Sth(F) is not satisfied, battery B is in the fully charged state and need not to be charged. Accordingly, the process proceeds to step S5. In step S5, a charging stop process is performed. Specifically, inverters 20 and 30 are stopped and relays RY1, RY2 are opened so that input of AC power to hybrid vehicle 100 is shut off. Then the process proceeds to step S6 where the control returns to the main routine.

Next, the control related to the SOC of battery B by control apparatus 60 is described.

Figure 8:
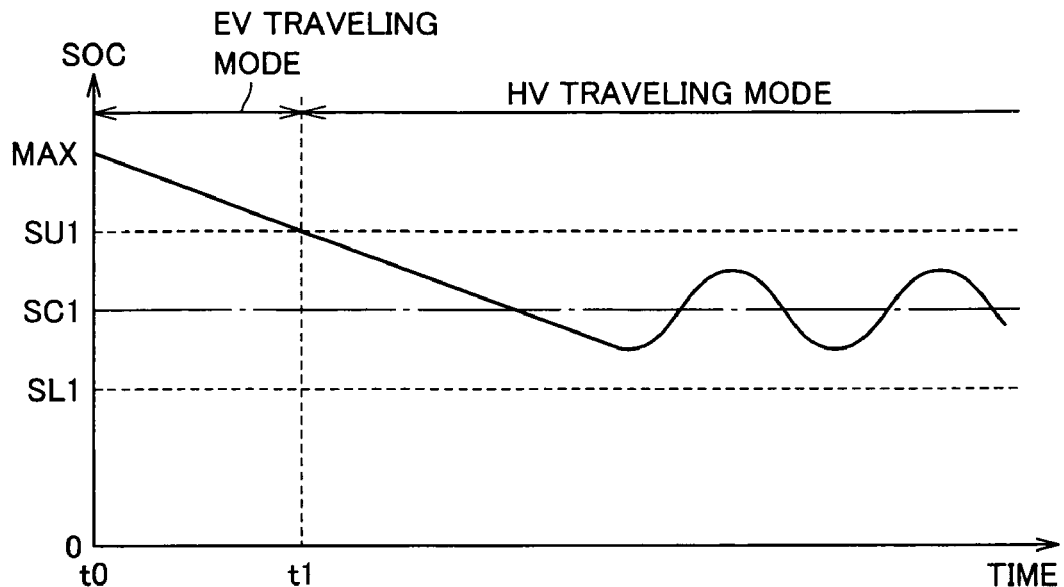
FIG. 8 shows changes in the SOC of the battery when an HV traveling-importance mode is selected by a mode changing switch shown in FIG. 1.

FIG. 8 shows changes in the SOC of battery B when the HV traveling-importance mode is selected by mode changing switch 52 shown in FIG. 1. Referring to FIG. 8, when the HV traveling-importance mode is selected by mode changing switch 52, control apparatus 60 sets the control range of the SOC of battery B with an upper limit value SU1 and a lower limit value SL1. It is to be noted that SC1 represents the center value in the control range of the SOC when the HV traveling-importance mode is selected.

It is assumed that, at time point t0, hybrid vehicle 100 starts traveling with battery B in the fully charged state. Until the SOC of battery B becomes lower than upper limit value SU1 at time point t1, generation by motor-generator MG1 using the output of engine 4 is not performed, and the EV traveling that uses the power stored in battery B is performed.

At time point t1, when the SOC of battery B becomes lower than upper limit value SU1, the traveling mode is switched from the EV traveling mode to the HV traveling mode that is predicated on driving of engine 4 and motor generator MG1. In accordance with the SOC of battery B, engine 4 and motor-generator MG1 are started or stopped, and the SOC of battery B is controlled to be in the range between upper limit value SU1 and lower limit value SL1.

Figure 9:
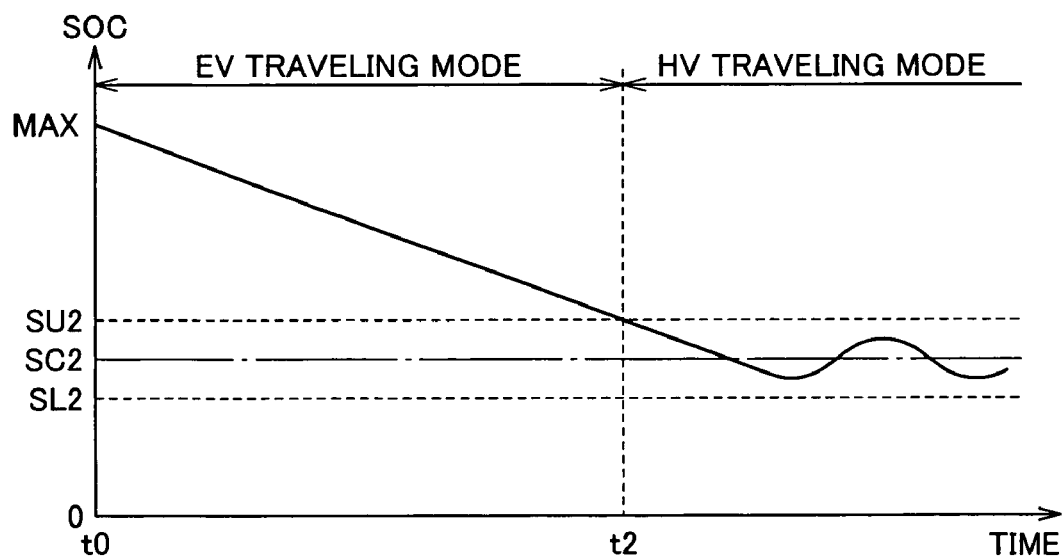
FIG. 9 shows changes in the SOC of the battery when an EV traveling-importance mode is selected by the mode changing switch shown in FIG. 1.

FIG. 9 shows changes in the SOC of battery B when the EV traveling-importance mode is selected by mode changing switch 52 shown in FIG. 1. Referring to FIG. 9, when the EV traveling-importance mode is selected by mode changing switch 52, control apparatus 60 sets the control range of the SOC of battery B with an upper limit value SU2 and a lower limit value SL2. It is to be noted that SC2 represents the center value in the control range of the SOC when the EV traveling-importance mode is selected.

Upper limit value SU2 and lower limit value SL2 are respectively lower than upper limit value SU1 and lower limit value SL1 shown in FIG. 8. That is, when the EV traveling-importance mode is selected by mode changing switch 52, control apparatus 60 sets the control range of the SOC of battery B lower than when the HV traveling-importance mode is selected by mode changing switch 52.

It is assumed that, at time point t0, hybrid vehicle 100 starts traveling with battery B in the fully charged state. Until the SOC of battery B becomes lower than upper limit value SU2 at time point t2, generation by motor-generator MG1 using the output of engine 4 is not performed, and the EV traveling that uses the power stored in battery B is performed.

At time point t2, when the SOC of battery B becomes lower than upper limit value SU2, the traveling mode is switched from the EV traveling mode to the HV traveling mode predicated on driving of engine 4 and motor generator MG1. In accordance with the SOC of battery B, engine 4 and motor-generator MG1 are started or stopped, and the SOC of battery B is controlled to be in the range between upper limit value SU2 and lower limit value SL2.

As can be seen from FIGS. 8 and 9, when the EV traveling-importance mode is selected by mode changing switch 52, the period of the EV traveling mode becomes longer than when the HV traveling-importance mode is selected by mode changing switch 52. That is, importance is placed on the EV traveling, rather than on the HV traveling. Then, the SOC of battery B will be controlled to the level lower than when the HV traveling-importance mode is selected.

Conversely, when the HV traveling-importance mode is selected by mode changing switch 52, it is switched from the EV traveling mode to the HV traveling mode at an earlier stage than when the EV traveling-importance mode is selected by mode changing switch 52. That is, importance is placed on the HV traveling, rather than on the EV traveling. Then, the SOC of battery B will be controlled to the level higher than when the EV traveling-importance mode is selected.

Accordingly, using mode changing switch 52 effectively, the electricity costs in charging battery B from commercial power supply 55 located external to the vehicle can be reduced. That is, when charging is to be carried out in a time slot where the electricity price is relatively inexpensive in a day (for example, the late-night electricity time slot) (for example, if charging equipment is provided at home and the driver will come home at night), the driver selects in advance the EV traveling-importance mode by mode changing switch 52. Then, the power stored in battery B is used by priority. Thus, when the driver comes home, the SOC of battery B attains the level lower than when the HV traveling-importance mode is selected. Accordingly, a greater amount of the inexpensive late-night electricity can be allotted to charging of battery B, whereby the electricity costs can be reduced.

On the other hand, when charging is to be carried out in a time slot where the electricity price is relatively expensive in a day (for example, the daytime), the driver selects in advance the HV traveling-importance mode by mode changing switch 52. Then, when charging is started, the SOC of battery B is at a level higher than when the EV traveling-importance mode has been selected, and therefore a charging amount of the expensive daytime electricity can be reduced. Thus, the electricity costs as a whole can be reduced.

Figure 10:
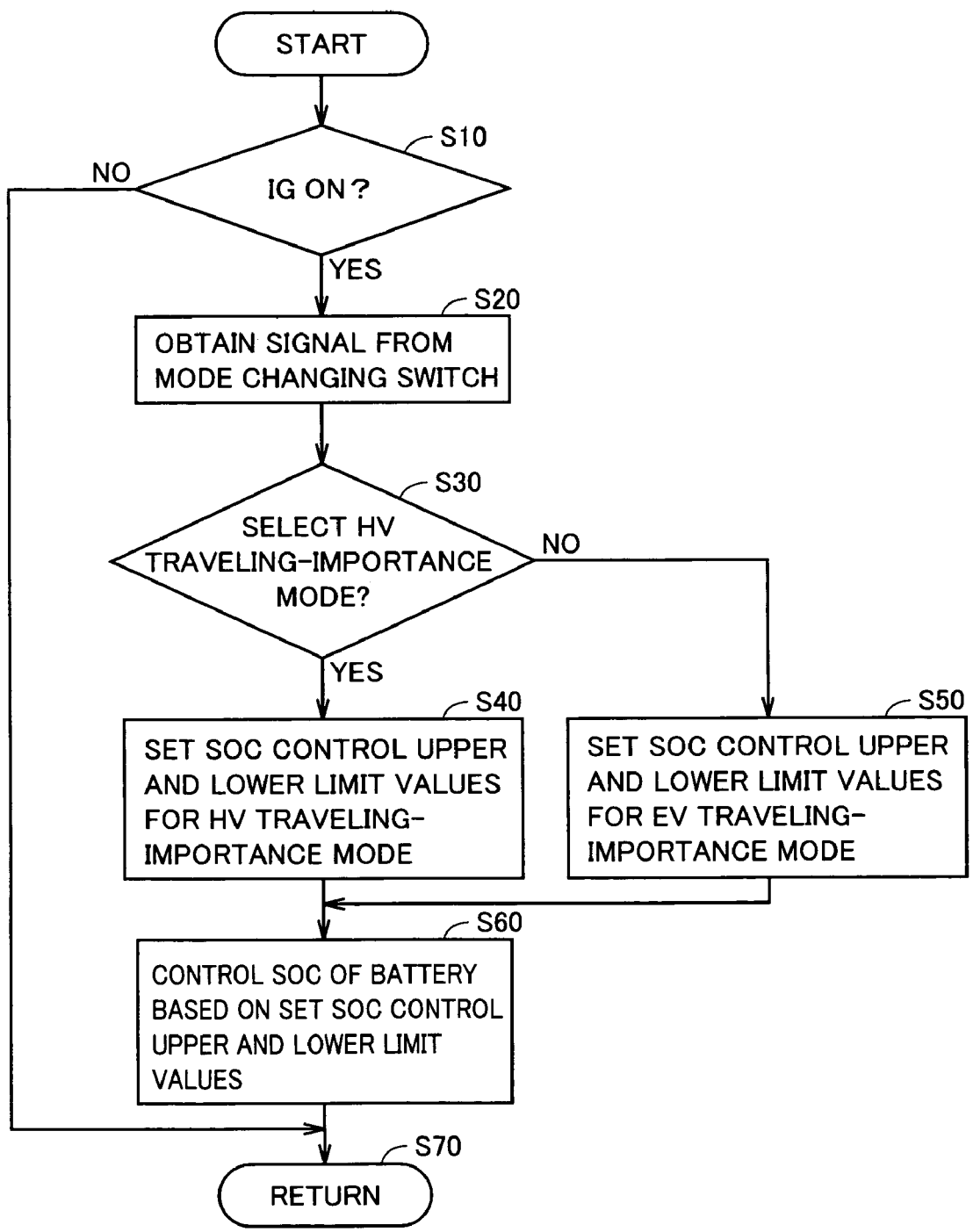
FIG. 10 is a flowchart showing a control structure of a program related to setting of the control range of the SOC by the control apparatus shown in FIG. 1.

FIG. 10 is a flowchart showing a control structure of a program related to setting of the control range of the SOC by control apparatus 60 shown in FIG. 1. The process shown in this flowchart is called from the main routine and executed, at regular time intervals or every time a prescribed condition is satisfied.

Referring to FIG. 10, control apparatus 60 determines whether or not the ignition key has been turned to the ON position, based on signal IG from the ignition key (step S10). When control apparatus 60 determines that the ignition key has not been turned to the ON position (NO in step S10), it ends the series of operations and control returns to the main routine (step S70).

When it is determined that the ignition key has been turned to the ON position in step S10 (YES in step S10), control apparatus 60 obtains a signal from mode changing switch 52 (step S20). Next, control apparatus 60 determines, based on the signal from mode changing switch 52, whether the HV traveling-importance mode is selected or the EV traveling-importance mode is selected by mode changing switch 52 (step S30).

When control apparatus 60 determines that the signal from mode changing switch 52 is at H level and that the HV traveling-importance mode is selected (YES in step S30), control apparatus 60 sets the SOC control upper and lower limit values for the HV traveling-importance mode (step S40). That is, control apparatus 60 sets upper limit value SU1 and lower limit value SL1 shown in FIG. 8 as the control upper and lower limit values of the SOC of battery B.

On the other hand, when control apparatus 60 determines that the signal from mode changing switch 52 is at L level and that the EV traveling-importance mode is selected (NO in step S30), control apparatus 60 sets the SOC control upper and lower limit values for the EV traveling-importance mode (step S50). That is, control apparatus 60 sets upper limit value SU2 and lower limit value SL2 shown in FIG. 8 as the control upper and lower limit values of the SOC of battery B.

When the control upper and lower limit values of the SOC are set in step S40 or S50, control apparatus 60 controls the SOC of battery B based on the set control upper and lower limit values (step S60). Then, control apparatus 60 ends the series of operations and the control returns to the main routine (step S70).

As described above, according to the first embodiment, the control range of the SOC of battery B can be switched by mode changing switch 52. Therefore, when the driver is expected to arrive at a location with charging equipment (for example, home) during the late-night electricity time slot where the electricity price is inexpensive, the driver can select the EV traveling-importance mode by mode changing switch 52, thereby setting the control range of the SOC of battery B to be lower -than when the normal HV traveling-importance mode predicated on the driving of engine 4 is selected. Then, the power charged in battery B is used by priority during the driving to home, and the amount of charging from external power supply 55 at home can be increased. Thus, a greater amount of inexpensive late-night electricity can be allotted to charging. Accordingly, the electricity costs in charging battery B from a source external to the vehicle can be reduced.

Second Embodiment

In the first embodiment, mode changing switch 52 is provided, and switching between the EV traveling-importance mode and the HV traveling-importance mode is a task of the driver. In the second embodiment, switching between the EV traveling-importance mode and the HV traveling-importance mode is automatically performed.

Figure 11:
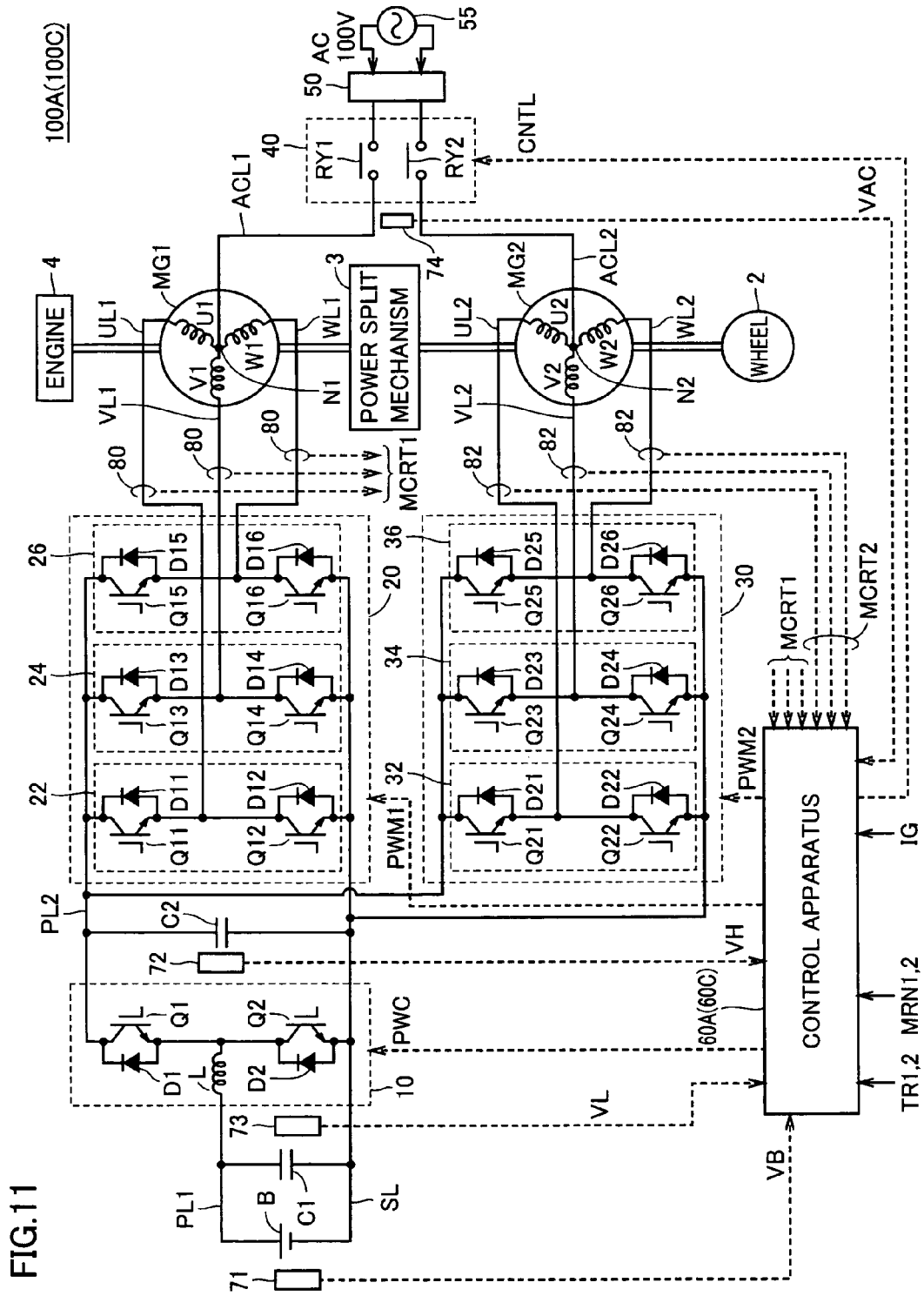
FIG. 11 is an overall block diagram of a hybrid vehicle according to a second embodiment of the present invention.

FIG. 11 is an overall block diagram of a hybrid vehicle according to the second embodiment of the present invention. Referring to FIG. 11, hybrid vehicle 100A does not include, in the configuration of hybrid vehicle 100 in the first embodiment shown in FIG. 1, mode changing switch 52, and includes a control apparatus 60A instead of control apparatus 60. The rest of the configuration of hybrid vehicle 100A is the same as hybrid vehicle 100.

By a method that will be described later, control apparatus 60A determines whether to employ the EV traveling-importance mode or the HV traveling-importance mode, in light of reducing electricity costs in charging battery B from commercial power supply 55 located external to the vehicle, and sets the control range of the SOC of battery B based on the determination result.

Figure 12:
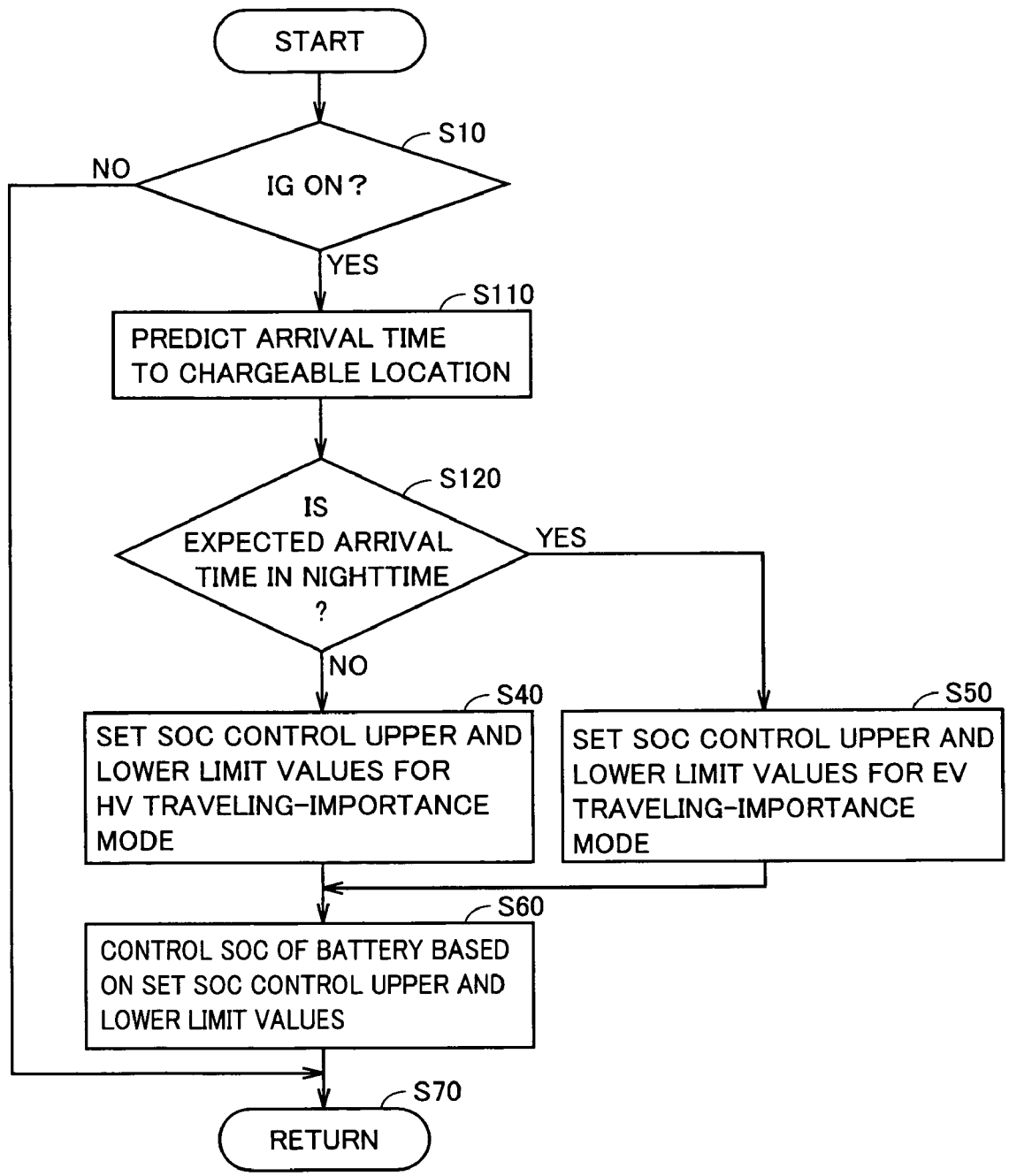
FIG. 12 is a flowchart showing a control structure of a program related to setting of a control range of the SOC by the control apparatus shown in FIG. 11.

FIG. 12 is a flowchart showing a control structure of a program related to setting of the control range of the SOC by control apparatus 60A shown in FIG. 11. The process shown in this flowchart is also called from the main routine and executed, at regular time intervals or every time a prescribed condition is satisfied.

Referring to FIG. 12, the control structure includes, in the control structure shown in FIG. 10, steps S110 and S120 instead of steps S20 and S30. That is, when it is determined that the ignition key has been turned to the ON position in step S10 (YES in step S10), control apparatus 60A predicts the arrival time to the location where battery B can be charged (for example, home) from commercial power supply 55 located external to the vehicle (step S110). As to the prediction of the arrival time, for example it can be calculated using positional information from a not-shown car navigation apparatus.

Next, control apparatus 60A determines whether or not the expected arrival time to the chargeable location is included in a prescribed time slot corresponding to the nighttime (step S120). When the expected arrival time to the chargeable location is not included in the prescribed time slot (that is, the expected arrival time is in the daytime) (NO in step S120), the process proceeds to step S40, and control apparatus 60A sets the SOC control upper and lower limit values for the HV traveling-importance mode.

On the other hand, when control apparatus 60A determines that the expected arrival time to the chargeable location is included in the prescribed time slot (that is, the expected arrival time is in the nighttime) (YES in step S120), the process proceeds to step S50, and control apparatus 60A sets the SOC control upper and lower limit values for the EV traveling-importance mode.

The rest of the configuration of control apparatus 60A is the same as control apparatus 60 in the first embodiment.

While it has been described that the EV traveling-importance mode is selected when control apparatus 60A determines that the expected arrival time is in the nighttime based on that the late-night electricity is less expensive than the daytime electricity, the above-described prescribed time slot may freely be set in accordance with the change in the electricity prices.

As described above, according to the second embodiment, the similar effect as in the first embodiment can be obtained. Furthermore, according to the second embodiment, the control range of the SOC of battery B is switched automatically based on the expected arrival time, and therefore the switching operation by the driver using mode changing switch 52 in the first embodiment is not necessary.

Third Embodiment

In the second embodiment, when the expected arrival time to the chargeable location is in the nighttime, the EV traveling-importance mode is selected. In this case, however, if the charging time is not fully ensured, the next traveling may not fully be covered (for example, when the remaining fuel amount of engine 4 is small, the next traveling will be started with both the fuel and SOC being low). Accordingly, in a third embodiment, even when the expected arrival time to the chargeable location will be in the nighttime, the HV traveling-importance mode is selected if the charging time is not fully ensured.

Figure 13:
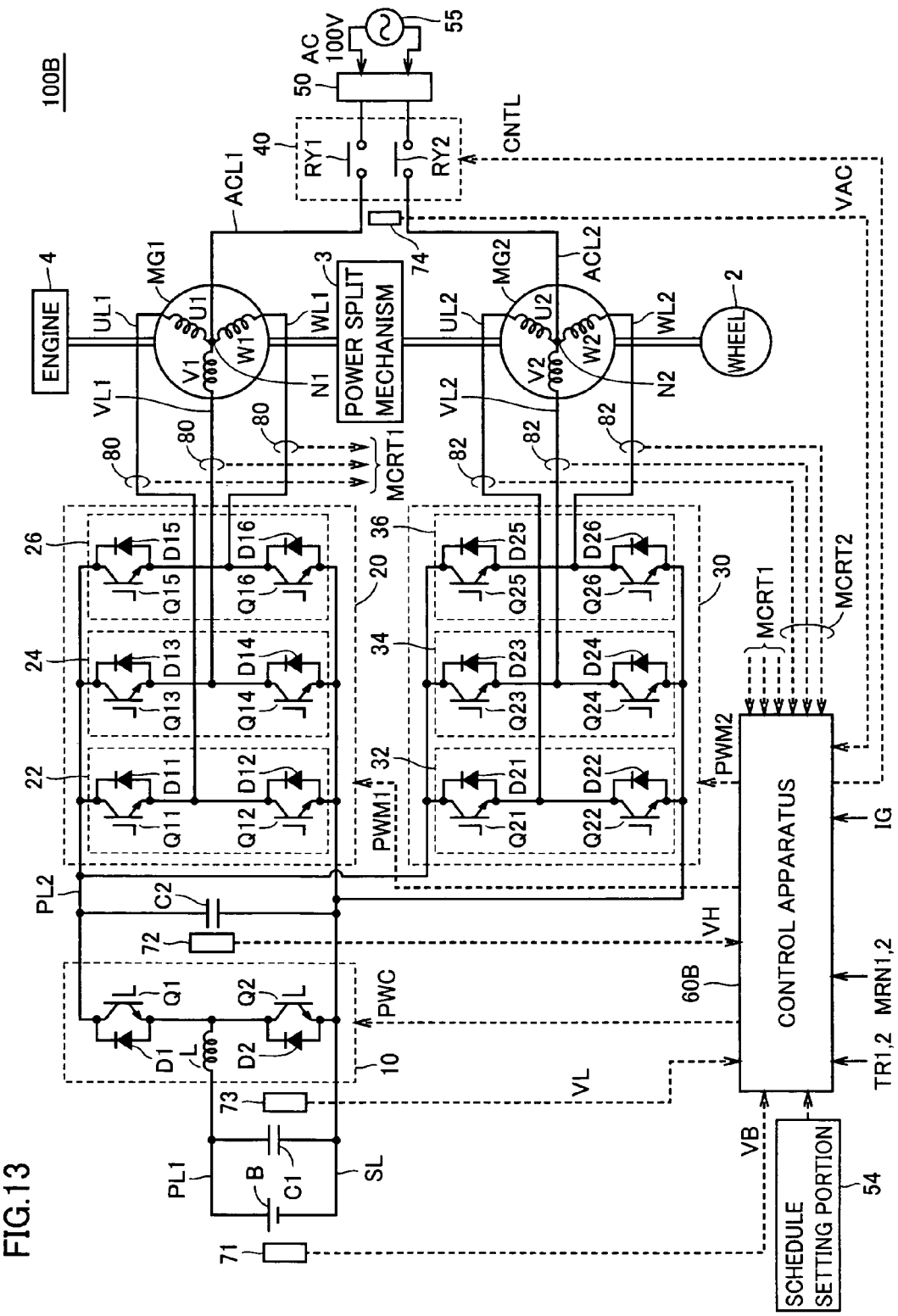
FIG. 13 is an overall block diagram of a hybrid vehicle according to a third embodiment of the present invention.

FIG. 13 is an overall block diagram of a hybrid vehicle according to the third embodiment of the present invention. Referring to FIG. 13, hybrid vehicle 100B further includes, in the configuration of hybrid vehicle 100A of the second embodiment shown in FIG. 11, a schedule setting portion 54, and a control apparatus 60B instead of control apparatus 60A. The rest of the configuration of hybrid vehicle 100B is the same as hybrid vehicle 100A.

Schedule setting portion 54 is an input apparatus for the driver to set a traveling schedule of the vehicle. The driver can set the traveling schedule of the vehicle including scheduled time for starting next traveling, from schedule setting portion 54. Schedule setting portion 54 outputs the traveling schedule set by the driver to control apparatus 60B.

Control apparatus 60B receives the traveling schedule set by the driver from schedule setting portion 54. Then, by a method that will be described later, control apparatus 60B determines whether to employ the HV traveling-importance mode or the EV traveling-importance mode, based on the expected arrival time to the chargeable location and the traveling schedule from schedule setting portion 54, and sets the control range of the SOC of battery B based on the determination result.

Figure 14:
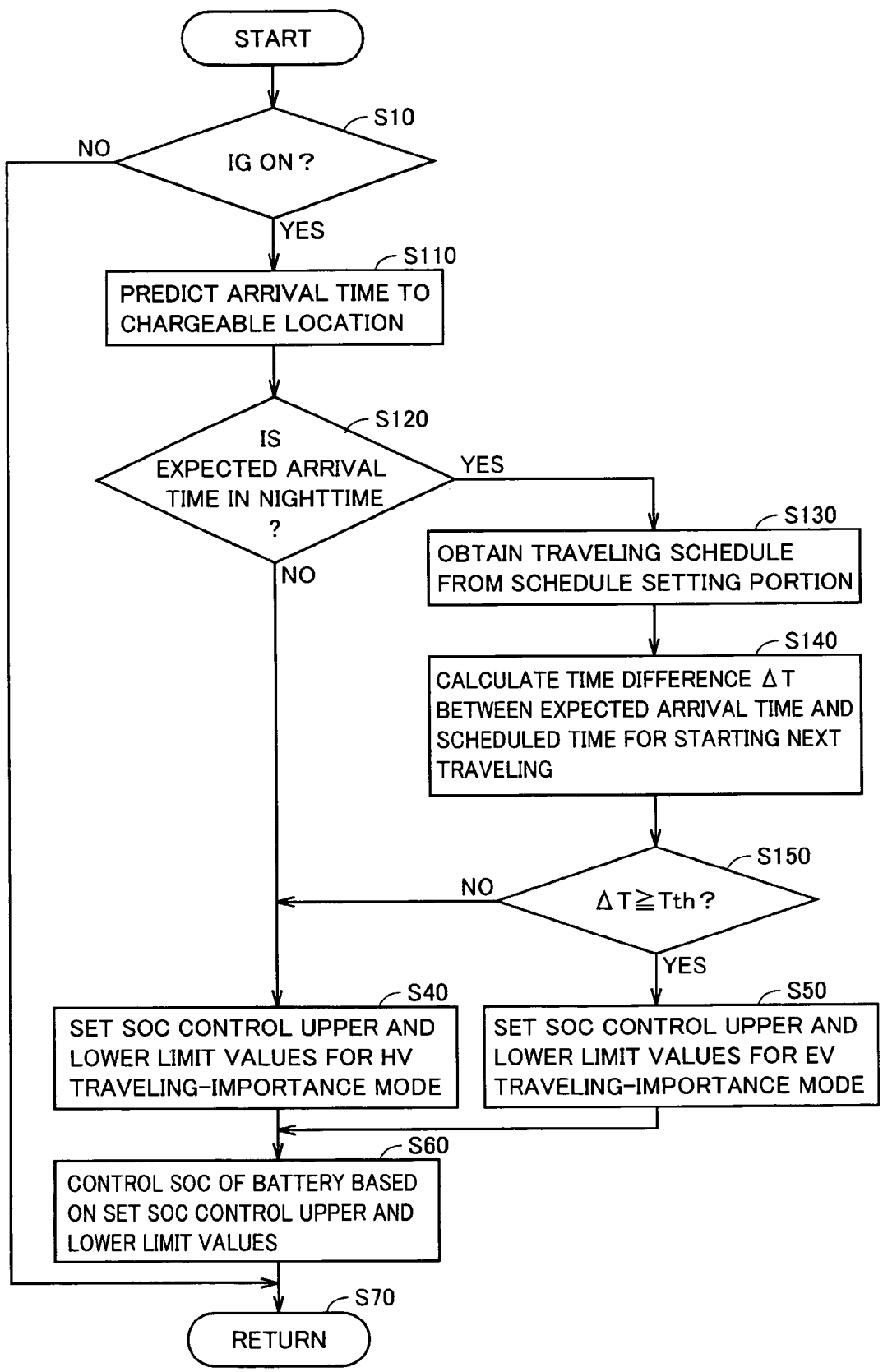
FIG. 14 is a flowchart showing a control structure of a program related to setting of a control range of the SOC by the control apparatus shown in FIG. 13.

FIG. 14 is a flowchart showing a control structure of a program related to setting of the control range of the SOC by control apparatus 60B shown in FIG. 13. The process shown in this flowchart is also called from the main routine and executed, at regular time intervals or every time a prescribed condition is satisfied.

Referring to FIG. 14, the control structure further includes, in the control structure shown in FIG. 12, steps S130-S150. That is, in step S120, when it is determined that the expected arrival time to the chargeable location is included in a prescribed time slot (that is, the expected arrival time is in the nighttime) (YES in step S120), control apparatus 60B obtains, from schedule setting portion 54, a traveling schedule set by the driver in schedule setting portion 54 (step S130).

Next, control apparatus 60B extracts scheduled time for starting next traveling, based on the traveling schedule from schedule setting portion 54, and calculates a time difference $\Delta T$ between the expected arrival time to the chargeable location predicted in step S110 and the scheduled time for starting next traveling (step S140). Then, control apparatus 60B determines whether or not the calculated time difference $\Delta T$ is not smaller than a minimum time Tth required for sufficiently charging battery B to a certain degree (step S150).

When control apparatus 60B determines that time difference $\Delta T$ is not smaller than minimum time Tth (YES in step S150), it determines that battery B can sufficiently be charged using late-night electricity at the chargeable location, and the process proceeds to step S50, where control apparatus 60B sets the SOC control upper and lower limit values for the EV traveling-importance mode.

On the other hand, when it is determined that time difference $\Delta T$ is smaller than minimum time Tth (NO in step S150), control apparatus 60B determines that battery B cannot sufficiently be charged, and the process proceeds to step S40, where control apparatus 60B sets the SOC control upper and lower limit values for the HV traveling-importance mode.

The rest of the configuration of control apparatus 60B is the same as control apparatus 60A in the second embodiment.

While it has been described that the traveling schedule of the vehicle is determined by schedule setting portion 54, the scheduled time for starting the next traveling can directly be set by schedule setting portion 54.

As described above, according to the third embodiment, when time difference $\Delta T$ between the expected arrival time and the scheduled time for starting the next traveling determined based on the traveling schedule set from schedule setting portion 54 is smaller than minimum time Tth, setting the control range of the SOC to a low range is stopped even if the expected arrival time is in the nighttime (that is, the HV traveling-importance mode is selected), the SOC of battery B for the next traveling is ensured. Accordingly, the situation where the SOC of battery B is unnecessarily reduced can be avoided.

Fourth Embodiment

In the third embodiment, schedule setting portion 54 is provided, and setting of the traveling schedule is a task of the driver. In a fourth embodiment, the traveling schedule is learned based on day-to-day traveling patterns, and setting of the traveling schedule is automated.

Referring to FIG. 11 again, a hybrid vehicle 100C in the fourth embodiment includes, in the configuration of hybrid vehicle 100A in the second embodiment, a control apparatus 60C instead of control apparatus 60A. The rest of the configuration of hybrid vehicle 100C is the same as that of hybrid vehicle 100A.

Control apparatus 60C learns the traveling schedule of hybrid vehicle 100C based on day-to-day traveling time. Control apparatus 60C determines whether to employ the HV traveling-importance mode or the EV traveling-importance mode, based on the expected arrival time to the chargeable location and the learned traveling schedule, and sets the control range of the SOC of battery B based on the determination result.

Figure 15:
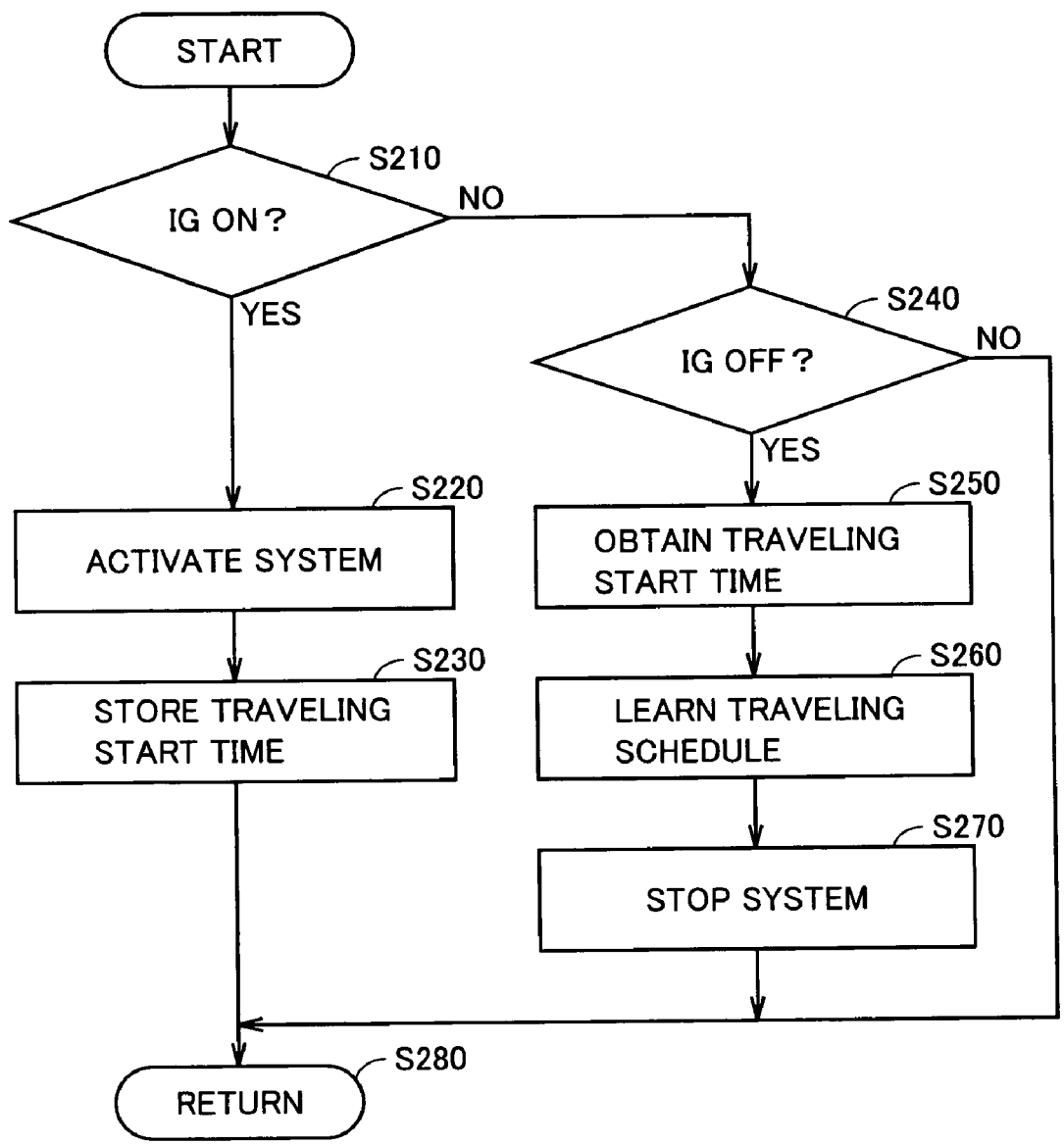
FIG. 15 is a flowchart showing a control structure of a program related to learning of a traveling schedule by a control apparatus according to a fourth embodiment.

FIG. 15 is a flowchart showing a control structure of a program related to learning of the traveling schedule by control apparatus 60C in the fourth embodiment. The process shown in this flowchart is also called from the main routine and executed, at regular time intervals or every time a prescribed condition is satisfied.

Referring to FIG. 15, control apparatus 60C determines whether or not the ignition key has been turned to the ON position, based on signal IG from the ignition key (step S210). When control apparatus 60C determines that the ignition key has been turned to the ON position (YES in step S210), the system of the vehicle is activated (step S220). When the system of the vehicle is activated, control apparatus 60C stores that system activation time as the traveling start time, in not-shown RAM (Random Access Memory) (step S230). Thereafter, control apparatus 60C ends the series of operations, and the control returns to the main routine (step S280).

When it is determined that the ignition key has not been turned to the ON position in step S210 (NO in step S210), control apparatus 60C determines whether or not the ignition key has been turned to the OFF position (step S240). When control apparatus 60C determines that the ignition key has not been turned to the OFF position (NO in step S240), it ends the series of the operations and the control returns to the main routine (step S280).

On the other hand, if it is determined that the ignition key has been turned to the OFF position in step S240 (YES in step S240), control apparatus 60C obtains from RAM the traveling start time that has been stored in RAM in step S230 (step S250). Then, control apparatus 60C reads learning data of the traveling schedule stored in not-shown readable/writable nonvolatile memory, and learns the traveling schedule based on the traveling start time of the current trip and the traveling end time at which the ignition key is turned to the OFF position (step S260).

When the traveling schedule is learned and the learning data of the traveling schedule after the learning is written to the nonvolatile memory in step S260, the system of the vehicle is stopped (step S270). Thereafter, control apparatus 60C ends the series of operations, and control returns to the main routine (step S280).

Figure 16:
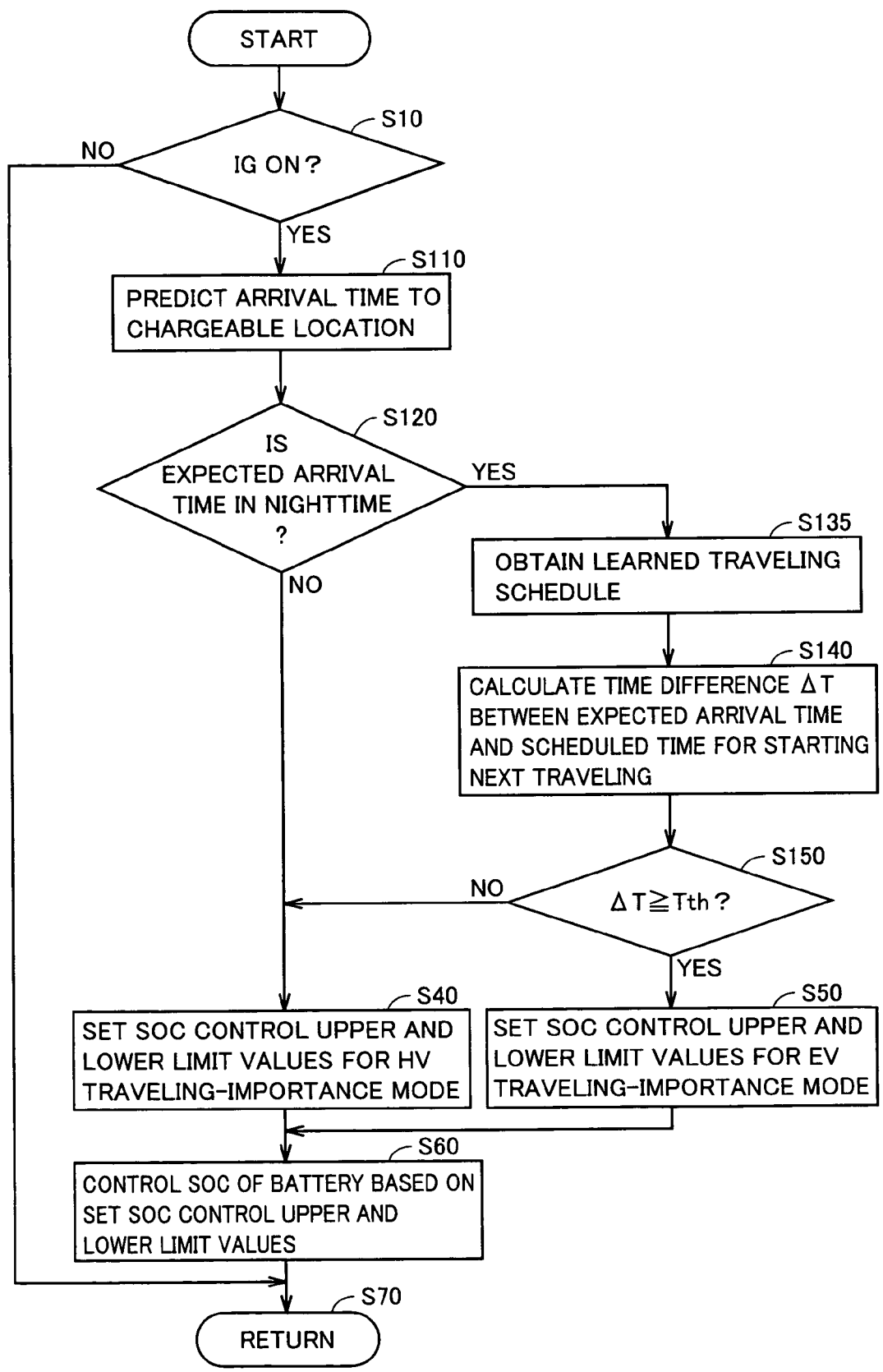
FIG. 16 is a flowchart showing a control structure of a program related to setting of a control range of the SOC by the control apparatus in the fourth embodiment.

FIG. 16 is a flowchart showing a control structure of a program related to the setting of the control range of the SOC by control apparatus 60C in the fourth embodiment. The process shown in this flowchart is also called from the main routine and executed, at regular time intervals or every time a prescribed condition is satisfied.

Referring to FIG. 16, the control structure includes, in the control structure shown in FIG. 14, step S135 instead of step S130. That is, in step S120, when it is determined that the expected arrival time to the chargeable location is included in a prescribed time slot (that is, the expected arrival time is in the nighttime) (YES in step S120), control apparatus 60C obtains the learning data of the traveling schedule learned by the process shown in FIG. 15, from the nonvolatile memory where it is stored (step S135).

Then, the process proceeds to step S140, and control apparatus 60B calculates scheduled time for starting the next traveling, based on the obtained learning data of the traveling schedule, and calculates time difference ΔT between the expected arrival time to the chargeable location and the scheduled time for starting the next traveling.

The rest of the configuration of control apparatus 60C is the same as that of control apparatus 60B in the third embodiment.

While it has been described that the traveling schedule of the vehicle is learned, the scheduled time for starting the next traveling may be directly learned.

As described above, according to the fourth embodiment, the similar effect as in the third embodiment can be obtained. According to the fourth embodiment, since the traveling schedule of the vehicle is learned based on the day-to-day traveling patterns of the vehicle, the setting of the traveling schedule by the driver required in the third embodiment is not necessary.

In the first to fourth embodiments, while it has been described that the SOC of battery B is controlled to be in a prescribed control range, that is, between upper limit value SU1 and lower limit value SL1 or between upper limit value SU2 and lower limit value SL2, the SOC of battery B can be controlled to be a prescribed control target value (for example, center value SC1 or SC2).

It has also been described that when the EV traveling-importance mode is selected by mode changing switch 52 or on determination that the expected arrival time is in the nighttime, the control range of the SOC is set to be lower than when the HV traveling-importance mode is selected. However, it is also possible to set, when the EV traveling-importance mode is selected, only an SOC lower limit value that is equal to or lower than SOC control lower limit value SL1 of the case where HV traveling-importance mode is selected, and the EV traveling mode is changed to the HV traveling mode if the SOC becomes lower than the lower limit value.

While it has been described that AC power from commercial power supply 55 is provided across neutral points N1, N2 of motor-generators MG1, MG2, and battery B is charged using each phase coil of motor-generators MG1, MG2 and inverters 20, 30, the present invention is also applicable to a hybrid vehicle provided with a separate external charging apparatus (AC/DC converter) in its interior or at its exterior. On the other hand, provision of the separate external charging apparatus is not necessary according to each embodiment above, and therefore reduction in costs and weight of the vehicle can be attained.

In the foregoing, engine 4 corresponds to "an internal combustion engine" in the present invention, and motor-generator MG2 corresponds to "a rotating electric machine" in the present invention. Battery B corresponds to "an electric power storage apparatus" in the present invention, and connector 50 corresponds to "an electric power input portion" in the present invention. Motor-generator MG1 and inverter 20 constitute "an electric power generation apparatus" in the present invention. Control apparatuses 60A-60C each correspond to "a control portion" in the present invention. Mode changing switch 52 corresponds to "an input apparatus" in the present invention. The process in step S110 performed by control apparatuses 60A-60C in the second to fourth embodiments corresponds to the process performed by "a predicting portion" in the present invention. Schedule setting portion 54 corresponds to "an input apparatus" in the present invention. The processes in steps S210-S270 performed by control apparatus 60C in the fourth embodiment correspond to the processes executed by "a learning portion" in the present invention. Motor generator MG1 corresponds to "an additional rotating electric machine" in the present invention. Inverters 20, 30 respectively correspond to "a second inverter" and "a first inverter" in the present invention. Furthermore, first and second inverter control portions 62, 63 and AC input control portion 64 constitute "an inverter control portion" in the present invention.

It should be understood that the embodiments disclosed herein are illustrative and non-restrictive in every respect. The scope of the present invention is defined by the claims, rather than the description of the embodiments above, and is intended to include any modifications within the meaning and scope equivalent to the terms of the claims.

The invention claimed is:

1. A hybrid vehicle incorporating an internal combustion engine and a rotating electric machine as its motive power sources, comprising:
an electric power storage apparatus capable of being charged and discharged and supplying electric power to said rotating electric machine;
an electric power input portion receiving electric power provided from a source external to the vehicle for charging said electric power storage apparatus;
an electric power generation apparatus generating electric power using an output from said internal combustion engine and supplying the generated electric power to said electric power storage apparatus;
control means for controlling a state of charge of said electric power storage apparatus to attain a prescribed control range or control target value; and
prediction means for predicting an arrival time to a location where said electric power storage apparatus can be charged from said electric power input portion,
said control means for switching between a first mode of driving by priority said internal combustion engine and said electric power generation apparatus and a second mode of stopping said internal combustion engine and said electric power generation apparatus and using by priority electric power stored in said electric power storage apparatus, and
said control means making, when an electricity price in a specified time slot in which the arrival time predicted by said prediction means is included is less expensive than an electricity price in a time slot other than said specified time slot, selection of said second mode as well as setting said prescribed control range or control target value to be lower than when said arrival time is included in the time slot other than said specified time slot.

2. The hybrid vehicle according to claim 1, wherein said specified time slot includes a late-night electricity time slot where the electricity price is inexpensive.

3. The hybrid vehicle according to claim 2, wherein said electric power generation apparatus includes an additional rotating electric machine having its rotation shaft mechanically linked to a crankshaft of said internal combustion engine,
the hybrid vehicle further comprising:
a first inverter provided corresponding to said rotating electric machine;
a second inverter provided corresponding to said additional rotating electric machine; and
inverter control means for controlling said first and second inverters,
said rotating electric machine and said additional rotating electric machine respectively including first and second three-phase coils as stator coils,
said electric power input portion including
a first terminal connected to a neutral point of said first three-phase coil, and
a second terminal connected to a neutral point of said second three-phase coil,
said inverter control means controlling said first and second inverters so that alternating-current power provided across said first and second terminals is converted into direct-current power and provided to said electric power storage apparatus.

4. The hybrid vehicle according to claim 1, further comprising
an input apparatus for setting a traveling schedule of the vehicle,
said control means stopping setting said prescribed control range or control target value to be low, when a time difference between the arrival time predicted by said prediction means and a scheduled time for starting next traveling determined based on the traveling schedule set from said input apparatus is shorter than a prescribed time period.

5. The hybrid vehicle according to claim 4, wherein said electric power generation apparatus includes an additional rotating electric machine having its rotation shaft mechanically linked to a crankshaft of said internal combustion engine,
the hybrid vehicle further comprising:
a first inverter provided corresponding to said rotating electric machine;
a second inverter provided corresponding to said additional rotating electric machine; and
inverter control means for controlling said first and second inverters,
said rotating electric machine and said additional rotating electric machine respectively including first and second three-phase coils as stator coils,
said electric power input portion including
a first terminal connected to a neutral point of said first three-phase coil, and
a second terminal connected to a neutral point of said second three-phase coil,
said inverter control means controlling said first and second inverters so that alternating-current power provided across said first and second terminals is converted into direct-current power and provided to said electric power storage apparatus.

6. The hybrid vehicle according to claim 1, further comprising
learning means for learning a traveling schedule of said vehicle based on a traveling pattern of the vehicle,
said control means stopping setting said prescribed control range or control target value to be low, when a time difference between the arrival time predicted by said prediction means and a scheduled time for starting next traveling determined based on the traveling schedule learned by said learning means is shorter than a prescribed time period.

7. The hybrid vehicle according to claim 6, wherein said electric power generation apparatus includes an additional rotating electric machine having its rotation shaft mechanically linked to a crankshaft of said internal combustion engine,
the hybrid vehicle further comprising:
a first inverter provided corresponding to said rotating electric machine;
a second inverter provided corresponding to said additional rotating electric machine; and
inverter control means for controlling said first and second inverters,
said rotating electric machine and said additional rotating electric machine respectively including first and second three-phase coils as stator coils,
said electric power input portion including
a first terminal connected to a neutral point of said first three-phase coil, and
a second terminal connected to a neutral point of said second three-phase coil, said inverter control means controlling said first and second inverters so that alternating-current power provided across said first and second terminals is converted into direct-current power and provided to said electric power storage apparatus.

8. The hybrid vehicle according to claim 1, wherein
said electric power generation apparatus includes an additional rotating electric machine having its rotation shaft mechanically linked to a crankshaft of said internal combustion engine,
the hybrid vehicle further comprising:
a first inverter provided corresponding to said rotating electric machine;
a second inverter provided corresponding to said additional rotating electric machine; and
inverter control means for controlling said first and second inverters,
said rotating electric machine and said additional rotating electric machine respectively including first and second three-phase coils as stator coils,
said electric power input portion including
a first terminal connected to a neutral point of said first three-phase coil, and
a second terminal connected to a neutral point of said second three-phase coil,
said inverter control means controlling said first and second inverters so that alternating-current power provided across said first and second terminals is converted into direct-current power and provided to said electric power storage apparatus.

9. The hybrid vehicle according to claim 1, wherein
the prescribed control range or control target valve is only set to be lower when the specified time slot defines a late-night electricity time slot where the electricity price is relatively inexpensive.

10. A controlling method of a hybrid vehicle incorporating an internal combustion engine and a rotating electric machine as its motive power sources, said hybrid vehicle including:
an electric power storage apparatus capable of being charged and discharged and supplying electric power to said rotating electric machine;
an electric power input portion receiving electric power provided from a source external to the vehicle for charging said electric power storage apparatus; and
an electric power generation apparatus generating electric power using an output from said internal combustion engine and supplying the generated electric power to said electric power storage apparatus,
said hybrid vehicle switching between a first mode of driving by priority said internal combustion engine and said electric power generation apparatus and a second mode of stopping said internal combustion engine and said electric power generation apparatus and using by priority electric power stored in said electric power storage apparatus,
said controlling method comprising:
a first step of predicting an arrival time to a location where said electric power storage apparatus can be charged from said electric power input portion;
a second step of making, when an electricity price in a specified time slot in which the predicted arrival time is included is less expensive than an electricity price in a time slot other than said specified time slot, selection of said second mode as well as setting a control range or control target value of a state amount representing a state of charge of said electric power storage apparatus to be lower than when said arrival time is included in the time slot other than said specified time slot; and
a third step of controlling said state amount to attain said control range or control target value.

11. The controlling method according to claim 10, wherein
said specified time slot includes a late-night electricity time slot where the electricity price is inexpensive.

12. The controlling method according to claim 11, wherein
said electric power generation apparatus includes an additional rotating electric machine having its rotation shaft mechanically linked to a crankshaft of said internal combustion engine,
said hybrid vehicle further including:
a first inverter provided corresponding to said rotating electric machine; and
a second inverter provided corresponding to said additional rotating electric machine,
said rotating electric machine and said additional rotating electric machine respectively including first and second three-phase coils as stator coils,
said electric power input portion including:
a first terminal connected to a neutral point of said first three-phase coil; and
a second terminal connected to a neutral point of said second three-phase coil,
said controlling method further comprising a ninth step of controlling said first and second inverters so that alternating-current power provided across said first and second terminals is converted into direct-current power and provided to said electric power storage apparatus.

13. The controlling method according to claim 10, wherein
said hybrid vehicle further includes an input apparatus for setting a traveling schedule of the vehicle,
said controlling method further comprising:
a fourth step of calculating a time difference between the arrival time predicted in said first step and a scheduled time for starting next traveling determined based on the traveling schedule set from said input apparatus; and
a fifth step of stopping, in said second step, setting said control range or control target value to be low, when said calculated time difference is shorter than a prescribed time period.

14. The controlling method according to claim 13, wherein
said electric power generation apparatus includes an additional rotating electric machine having its rotation shaft mechanically linked to a crankshaft of said internal combustion engine,
said hybrid vehicle further including:
a first inverter provided corresponding to said rotating electric machine; and
a second inverter provided corresponding to said additional rotating electric machine,
said rotating electric machine and said additional rotating electric machine respectively including first and second three-phase coils as stator coils,
said electric power input portion including:
a first terminal connected to a neutral point of said first three-phase coil; and
a second terminal connected to a neutral point of said second three-phase coil,
said controlling method further comprising a ninth step of controlling said first and second inverters so that alternating-current power provided across said first and second terminals is converted into direct-current power and provided to said electric power storage apparatus.

15. The controlling method according to claim 10, further comprising:
- a sixth step of learning a traveling schedule of said vehicle based on a traveling pattern of the vehicle;
- a seventh step of calculating a time difference between the arrival time predicted in said first step and a scheduled time for starting next traveling determined based on the traveling schedule learned in said sixth step; and
- an eighth step of stopping, in said second step, setting said control range or control target value to be low, when said calculated time difference is shorter than a prescribed time period.

16. The controlling method according to claim 15, wherein said electric power generation apparatus includes an additional rotating electric machine having its rotation shaft mechanically linked to a crankshaft of said internal combustion engine,
said hybrid vehicle further including:
- a first inverter provided corresponding to said rotating electric machine; and
- a second inverter provided corresponding to said additional rotating electric machine,
said rotating electric machine and said additional rotating electric machine respectively including first and second three-phase coils as stator coils,
said electric power input portion including:
- a first terminal connected to a neutral point of said first three-phase coil; and
- a second terminal connected to a neutral point of said second three-phase coil,
said controlling method further comprising a ninth step of controlling said first and second inverters so that alternating-current power provided across said first and second terminals is converted into direct-current power and provided to said electric power storage apparatus.

17. The controlling method according to claim 10, wherein said electric power generation apparatus includes an additional rotating electric machine having its rotation shaft mechanically linked to a crankshaft of said internal combustion engine,
said hybrid vehicle further including:
- a first inverter provided corresponding to said rotating electric machine; and
- a second inverter provided corresponding to said additional rotating electric machine,
said rotating electric machine and said additional rotating electric machine respectively including first and second three-phase coils as stator coils,
said electric power input portion including:
- a first terminal connected to a neutral point of said first three-phase coil; and
- a second terminal connected to a neutral point of said second three-phase coil,
said controlling method further comprising a ninth step of controlling said first and second inverters so that alternating-current power provided across said first and second terminals is converted into direct-current power and provided to said electric power storage apparatus.

18. The controlling method according to claim 10, further comprising:
- setting the prescribed control range or control target valve to be lower only when the specified time slot defines a late-night electricity time slot where the electricity price is relatively inexpensive.

* * * * *